(12) United States Patent
Horai et al.

(10) Patent No.: US 11,859,678 B2
(45) Date of Patent: Jan. 2, 2024

(54) WORKING VEHICLE AND TRACTOR

(71) Applicant: KUBOTA CORPORATION, Osaka (JP)

(72) Inventors: Kohei Horai, Osaka (JP); Yoshihiko Kuroshita, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 62 days.

(21) Appl. No.: 17/749,556

(22) Filed: May 20, 2022

(65) Prior Publication Data

US 2022/0397165 A1    Dec. 15, 2022

(30) Foreign Application Priority Data

Jun. 14, 2021 (JP) ................................ 2021-098794

(51) Int. Cl.
*F16D 48/02* (2006.01)
*B60K 35/00* (2006.01)
(Continued)

(52) U.S. Cl.
CPC .............. *F16D 48/02* (2013.01); *B60K 35/00* (2013.01); *B62D 49/06* (2013.01); *F16D 67/02* (2013.01); *B60K 2370/126* (2019.05); *B60K 2370/1434* (2019.05); *B60K 2370/168* (2019.05); *F16D 25/12* (2013.01)

(58) Field of Classification Search
CPC .......... F16D 48/02; F16D 48/06; F16D 67/02; F16D 25/12; F16D 2500/10412; F16D 2500/111; F16D 2500/1112; F16D 2500/31413; F16D 2500/31426; F16D 2500/7041; F16D 2500/70414; F16D 2500/7049; F16D 2500/70689;
(Continued)

(56) References Cited

U.S. PATENT DOCUMENTS 6,318,530 B1 * 11/2001 Asada ................... B60W 10/02
477/80
2010/0298094 A1 * 11/2010 Oda ...................... F16D 48/064
477/179
(Continued)

FOREIGN PATENT DOCUMENTS

JP        2017-62009 A     3/2017
WO   WO-2018172512 A1 *  9/2018 ............. F16D 48/06

*Primary Examiner* — Lori Wu
(74) *Attorney, Agent, or Firm* — GREENBLUM & BERNSTEIN. P.L.C.

(57) ABSTRACT

A working vehicle includes: a clutch displaceable to a connected state in which power is transmitted to a drive, a disconnected state in which the transmission is disconnected, and a half-clutch state in which power is slidably and partly transmitted to the drive; a detector that detects an operation position of a clutch pedal and outputs a detected value corresponding to the operation position detected; a control device that brings the clutch into the half-clutch state if the detected value corresponds with a threshold, and brings the clutch into the disconnected state if the detected value is less than the threshold and into the connected state if the detected value is greater than the threshold, and vice versa; and a change unit that changes the threshold to a different value in accordance with an operation on the operation member.

11 Claims, 17 Drawing Sheets

(51) Int. Cl.
*B62D 49/06* (2006.01)
*F16D 67/02* (2006.01)
*F16D 25/12* (2006.01)

(58) Field of Classification Search
CPC .............. B60K 35/00; B60K 2370/126; B60K 2370/1434; B60K 2370/168
See application file for complete search history.

(56) References Cited

U.S. PATENT DOCUMENTS

2016/0167659 A1\* 6/2016 Gibson ................... F16D 48/06
701/67
2016/0176405 A1\* 6/2016 Saitoh ................. F16H 61/0204
477/70

\* cited by examiner

| Sensitivity | Threshold voltage (V) | Stroke length of clutch pedal |
|---|---|---|
| 5 (High) | 1.0V | L5 |
| 3 (Intermediate) | 2.5V | L3 |
| 1 (Low) | 4.0V | L1 |

| No | Automatic switch control | Forward-travel/ Reverse-travel switching | Clutch pedal | Brake pedal | Traveling clutch |
|---|---|---|---|---|---|
| 1 | Invalid | Forward travel (F) or Reverse travel (R) | OFF | OFF | Connected |
| 2 | Invalid | Forward travel (F) or Reverse travel (R) | OFF | ON | Connected |
| 3 | Invalid | Forward travel (F) or Reverse travel (R) | ON | OFF | Disconnected |
| 4 | Invalid | Forward travel (F) or Reverse travel (R) | ON | ON | Disconnected |
| 5 | Invalid | Neutral (N) | OFF | OFF | Disconnected |
| 6 | Invalid | Neutral (N) | OFF | ON | Disconnected |
| 7 | Invalid | Neutral (N) | ON | OFF | Disconnected |
| 8 | Invalid | Neutral (N) | ON | ON | Disconnected |

Fig.8B

| No | Previous state | | | | Subsequent state | | | | | | |
|---|---|---|---|---|---|---|---|---|---|---|---|
| | Automatic switch control | Forward-Travel /Reverse-Travel switching | Clutch pedal | Brake pedal | Traveling clutch | Clutch pedal | | | Brake pedal | | |
| | | | | | | OFF | ON | Mode | OFF | ON | Mode |
| 11 | Valid | Forward travel (F) or Reverse travel (R) | OFF | OFF | Connected | – | Disconnected | Keep valid | – | Disconnected (First process) | Keep valid |
| 12 | Valid | | OFF | ON | Disconnected (First process) | – | Keep disconnected | Switch to invalid | Connected | – | |
| 13 | Valid | | ON | OFF | Disconnected | Connected | – | Keep valid | – | Keep disconnected | Switch to invalid |
| 14 | Valid | | ON | ON | Disconnected | Keep disconnected | – | | Disconnected | – | Keep valid |

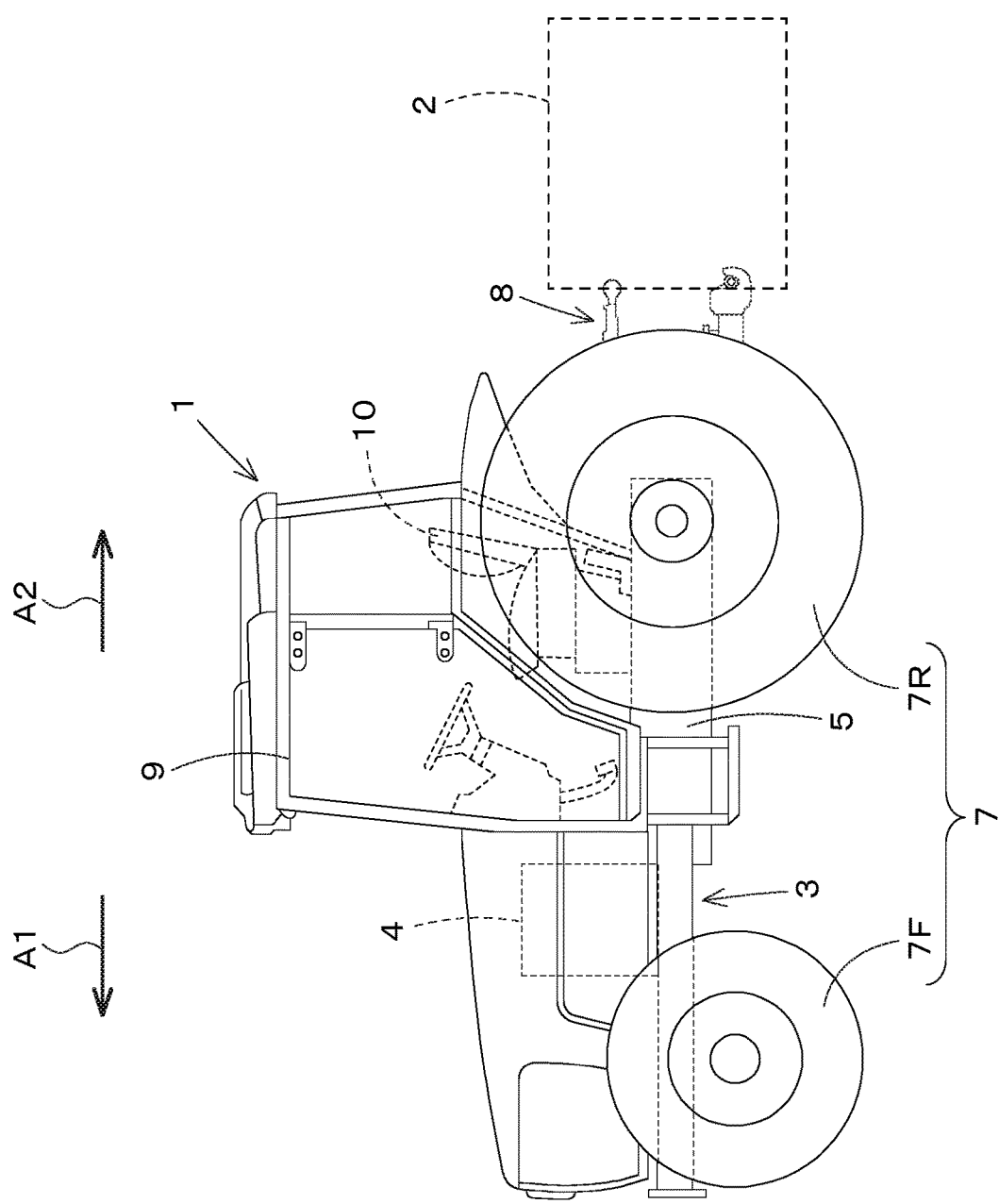

WORKING VEHICLE AND TRACTOR

CROSS REFERENCE TO RELATED APPLICATIONS

This application claims the benefit of priority to Japanese Patent Application No. 2021-098794 filed on Jun. 14, 2021. The entire contents of this application are hereby incorporated herein by reference.

BACKGROUND OF THE INVENTION

1. Field of the Invention

The present invention relates to a working vehicle and a tractor, for example.

2. Description of the Related Art

In the related art, there is a technique for preventing galling of a clutch mechanism due to excessively long continuation of a so-called half-clutch state in a tractor including the clutch mechanism that works together with a clutch pedal. Japanese Unexamined Patent Application Publication No. 2017-62009 describes a tractor including a potentiometer that detects a depressed amount of a clutch pedal. The tractor detects, by using the potentiometer, the half-clutch state in which the clutch pedal is in an intermediate position between a maximum depressed position and a released position and outputs a warning when the half-clutch state continues for a predetermined time period.

SUMMARY OF THE INVENTION

The tractor described in Japanese Unexamined Patent Application Publication No. 2017-62009 merely has a configuration that detects the half-clutch state and outputs a warning when the half-clutch state continues for a predetermined time period. Thus, if the position of the half-clutch is inappropriate depending on a physique or the like of an operator or if the operator is not used to a clutch operation, the galling of the clutch mechanism may be induced.

The present invention has been made so as to solve the above problem of the related art, and an object of the present invention is to provide a working vehicle that can improve operability of a clutch operation.

Technical means of the present invention for solving the technical problem is as follows.

A working vehicle according to an aspect of the present invention includes: a prime mover that outputs power; a drive driven by the power output from the prime mover; a transmission mechanism that transmits the power output from the prime mover to the drive; a clutch provided in the transmission mechanism and displaceable to a connected state in which the power is transmitted to the drive, a disconnected state in which transmission of the power to the drive is disconnected, and a half-clutch state in which the power is slidably and partly transmitted to the drive; a clutch pedal; a detector that detects an operation position of the clutch pedal and outputs a detected value corresponding to the operation position detected; a control device that brings the clutch into the half-clutch state if the detected value from the detector corresponds with a predetermined threshold, brings the clutch into the disconnected state if the detected value is either one of a value less than the threshold and a value greater than the threshold, and brings the clutch into the connected state if the detected value is the other of the value less than the threshold and the value greater than the threshold; an operation member; and a change unit that changes a value of the threshold to a different value in accordance with an operation on the operation member.

If the clutch pedal is in a maximum operation position, the detector may output a predetermined first detected value as the detected value. If the clutch pedal is in an unoperated position, where no operation is performed, the detector may output a predetermined second detected value, which is a value separated from the first detected value by a certain value range, as the detected value. The threshold may be a predetermined single value among a plurality of values that are present between the first detected value and the second detected value. In accordance with the operation on the operation member, the change unit may change the value of the threshold to a value closer to the first detected value than a default value is or a value closer to the second detected value than the default value is.

The working vehicle may further include a display device, in which the control device may cause the display device to display the threshold that is set and may cause the display device to display the threshold to be changed by the change unit in accordance with the operation on the operation member.

The working vehicle may further include a display device, in which the control device may cause the display device to display, as a sensitivity of the clutch pedal, the threshold that is set, and may cause the display device to display, as the sensitivity of the clutch pedal, the threshold to be changed by the change unit in accordance with the operation on the operation member.

The operation member may be a dial switch provided on an operation lever, and the change unit may change the value of the threshold to a different value in accordance with an operation on the dial switch.

The operation member may be a display device including a display panel and a touch panel that is disposed on a surface of the display panel, and the change unit may change the value of the threshold to a different value in accordance with a touch operation on the touch panel.

The working vehicle may further include a brake operation member; a brake device capable of braking the drive in accordance with an operation on the brake operation member; and a switching unit that selects whether automatic switch control is valid or invalid, the automatic switch control being control for switching the clutch from the connected state to the disconnected state, in which the control device may, if the automatic switch control is invalid, upon an operation on the brake operation member, perform brake control for braking the drive in accordance with the operation on the brake operation member, and, if the automatic switch control is valid, upon an operation on the brake operation member, perform the brake control and disconnection control for switching the clutch from the connected state to the disconnected state, and, when the operation on the brake operation member is released after the disconnection control, perform connection control for switching the clutch from the disconnected state to the connected state through the half-clutch state by using the threshold whose value is changed by the change unit.

If the clutch pedal is in a maximum operation position, the detector may output a predetermined first detected value as the detected value. If the clutch pedal is in an unoperated position, where no operation is performed, the detector may output a predetermined second detected value, which is a value separated from the first detected value by a certain value range, as the detected value. The threshold may be a predetermined single value among a plurality of values that are present between the first detected value and the second detected value. In accordance with the operation on the operation member, the change unit may change the value of the threshold to a value closer to the first detected value than a default value is.

The working vehicle may further include: a second operation member that is different from the operation member serving as a first operation member, in which if the first operation member and the second operation member are operated, the change unit may change the value of the threshold to a different value in accordance with the operation on the first operation member, and, if the first operation member is operated in a state where the second operation member is not operated, the change unit may not change the value of the threshold to a different value regardless of the operation on the first operation member.

The working vehicle may be a tractor including: a vehicle body; and a coupler that is provided for the vehicle body and that couples a working device for working to the vehicle body.

The drive may be a traveling device that gives a propelling force to the vehicle body, and the clutch may be provided in the transmission mechanism and may be displaceable to a connected state in which the power is transmitted to the traveling device, a disconnected state in which transmission of the power to the traveling device is disconnected, and a half-clutch state in which the power is slidably and partly transmitted to the traveling device.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 6C is a diagram illustrating a relationship among the sensitivity, the threshold voltage, and the stroke length of the clutch pedal.

FIG. 8A is a diagram illustrating a relationship among operations on a clutch lever, the clutch pedal, and the brake pedal and a state of a traveling clutch when the automatic switch control is invalid.

FIG. 8B is a diagram illustrating a relationship among operations on the clutch lever, the clutch pedal, and the brake pedal and the state of the traveling clutch when the automatic switch control is valid.

FIG. 9 is an overall view of the tractor.

DETAILED DESCRIPTION OF THE PREFERRED EMBODIMENTS

Figure 1:
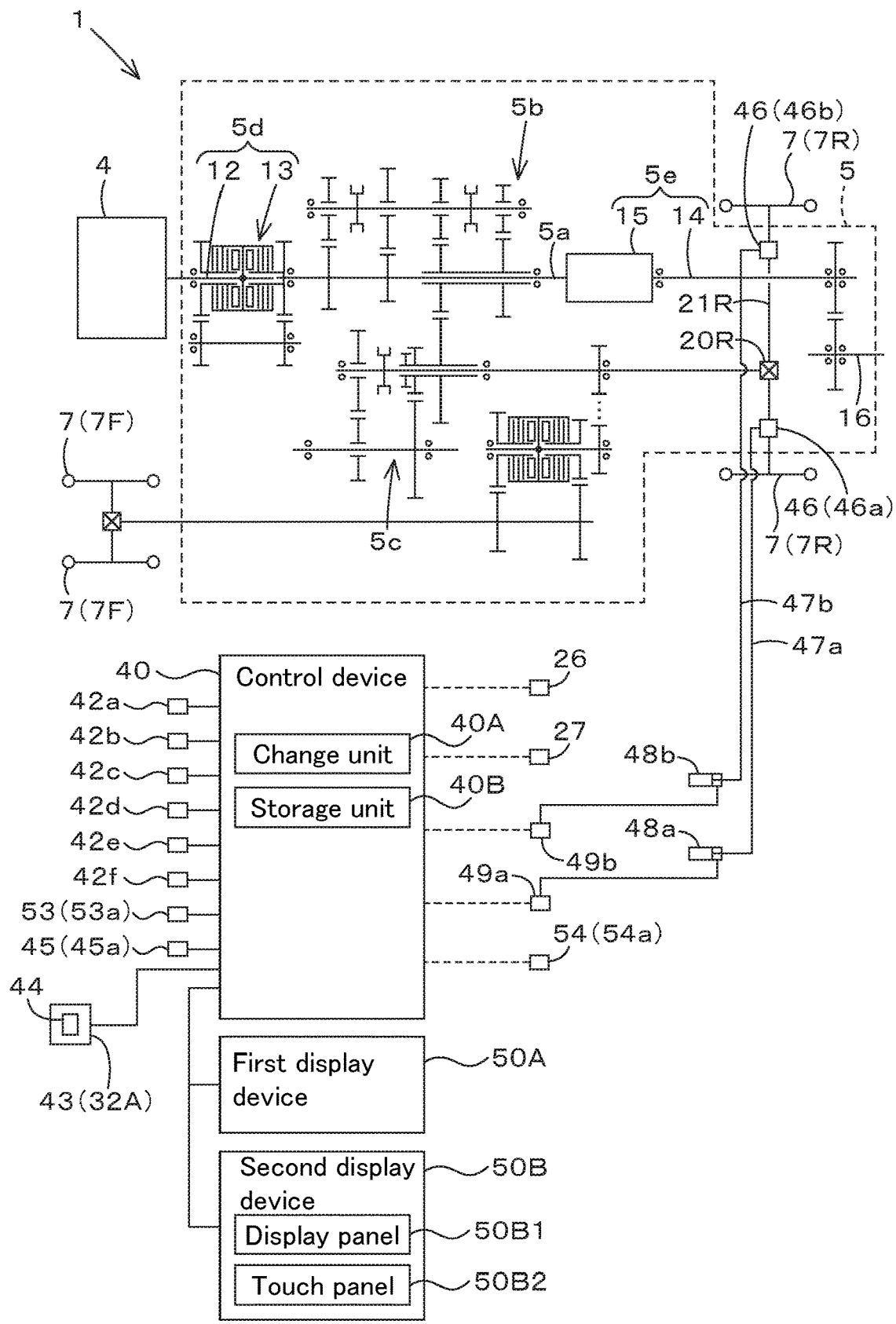
FIG. 1 is a block diagram illustrating a configuration and control of a tractor.

The preferred embodiments will now be described with reference to the accompanying drawings, wherein like reference numerals designate corresponding or identical elements throughout the various drawings. The drawings are to be viewed in an orientation in which the reference numerals are viewed correctly.

An embodiment of the present invention will be described below with reference to the drawings.

FIG. 9 is a side view illustrating an embodiment of a working vehicle 1. In a case of this embodiment, the working vehicle 1 is a tractor. However, the working vehicle 1 is not limited to a tractor and may be an agricultural machine (agricultural vehicle) such as a combine or a transplanter, a construction machine (construction vehicle) such as a loader working machine, and the like.

Hereinafter, a direction in which an operator who is seated on an operator's seat 10 of the working vehicle (tractor) 1 is oriented (direction of arrow A1 in FIG. 9) is referred to as "front", while the opposite direction thereof (direction of arrow A2 in FIG. 9) is referred to as "back". In addition, the left of the operator is referred to as "left", while the right of the operator is referred to as "right". Furthermore, a horizontal direction orthogonal to the front-back direction of the working vehicle 1 is referred to as "vehicle-body width direction".

As illustrated in FIG. 9, the working vehicle (tractor) 1 includes a vehicle body 3, a prime mover 4, and a transmission 5. The vehicle body 3 has a traveling device 7 and is capable of traveling. The traveling device 7 is a drive driven by power output from the prime mover 4 and has front wheels 7F and rear wheels 7R. The front wheels 7F may be of a tire type or a crawler type. The rear wheels 7R may also be of a tire type or a crawler type.

The prime mover 4 is a diesel engine, an electric prime mover, or the like and is a machine that outputs power. In this embodiment, the prime mover 4 is a diesel engine. The transmission 5 is a transmission mechanism that transmits power output from the prime mover 4 to the traveling device 7 (drive). The transmission 5 can switch a propelling force of the traveling device 7 by changing gears and can switch the traveling device 7 between forward travel and reverse travel. The vehicle body 3 is provided with the operator's seat 10.

A coupler 8 is provided in a rear portion of the vehicle body 3. A working device 2 can be attached to and detached from the coupler 8. By the working device 2 being coupled to the coupler 8, the vehicle body 3 can tract the working device 2. Examples of the working device 2 include a cultivator for cultivation, a fertilizer spreader for spreading a fertilizer, an agricultural chemical spreader for spreading an agricultural chemical, a harvester for harvesting, a mower for mowing grass or the like, a tedder for tedding grass or the like, a rake for raking grass or the like, and a baler for baling grass or the like.

Figure 2:
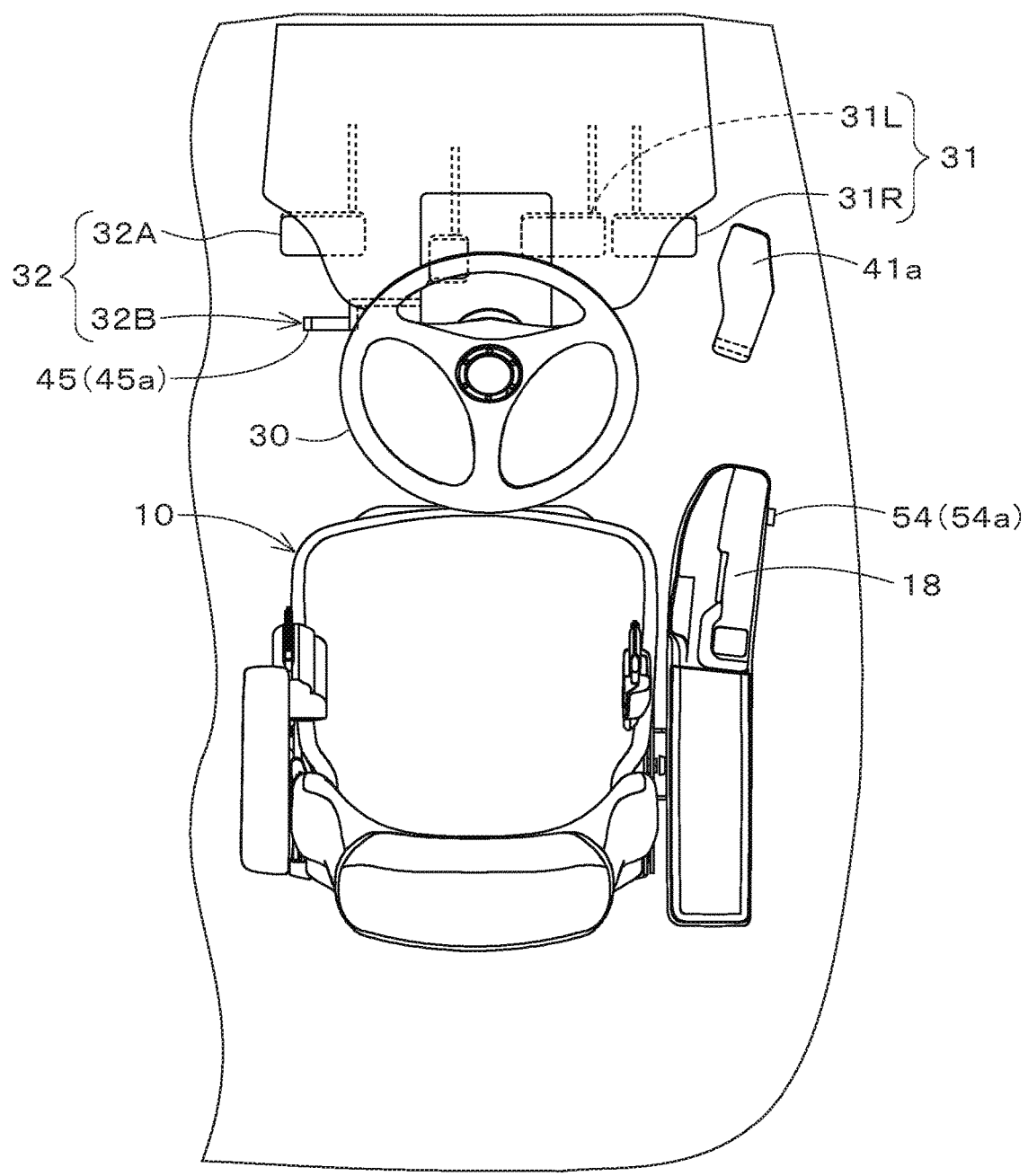
FIG. 2 is a diagram illustrating an operator's seat and its surroundings.

As illustrated in FIG. 2, a steering wheel 30 for steering the vehicle body 3, a brake operation member 31, and a clutch switch member 32 are provided around the operator's seat 10. The brake operation member 31 includes a plurality of operation units, for example, a brake pedal 31L provided on the left and a brake pedal 31R provided on the right. The brake pedal 31L and the brake pedal 31R are supported by the vehicle body 3 in a swingable manner and can be operated by the operator seated on the operator's seat 10.

The clutch switch member 32 includes a clutch pedal 32A and a clutch lever 32B. The clutch pedal 32A is supported by the vehicle body 3 in a swingable manner and can be operated by the operator seated on the operator's seat 10, similarly to the brake pedal 31L and the brake pedal 31R. For example, the clutch lever 32B is supported in a swingable manner near the steering wheel 30 and is switchable among a forward-travel position (F), a reverse-travel position (R), or a neutral position (N).

As illustrated in FIG. 1, the transmission 5 includes a main shaft (propeller shaft) 5a, a main transmission unit 5b, a sub-transmission unit 5c, a traveling clutch 5d, and a power take-off (PTO) power transmission unit 5e. The propeller shaft 5a is rotatably supported by a housing case (transmission case) of the transmission 5, and power from a crankshaft of the prime mover 4 is transmitted to the propeller shaft 5a. The main transmission unit 5b has a plurality of gears and a gearshift that changes connection of the gears. The main transmission unit 5b changes connection (engagement) of the plurality of gears by using the gearshift as appropriate to change and output rotation input from the propeller shaft 5a (change gears).

Similarly to the main transmission unit 5b, the sub-transmission unit 5c also has a plurality of gears and a gearshift that changes connection of the gears. The sub-transmission unit 5c changes connection (engagement) of the plurality of gears by using the gearshift as appropriate to change and output rotation input from the main transmission unit 5b (change gears).

The traveling clutch 5d is a traveling device that is switchable between a connected state in which power is transmitted to the traveling device 7 (the front wheels 7F and the rear wheels 7R) and a disconnected state in which transmission of power to the traveling device 7 is disconnected. In addition, the traveling clutch 5d can be displaced to a half-clutch state in which power is slidably and partly transmitted to the traveling device 7 in response to the disconnected state being switched to the connected state. The traveling clutch 5d has a shuttle shaft 12 and a clutch switch unit 13. Power output from the prime mover 4 is transmitted to the shuttle shaft 12. The clutch switch unit 13 is a hydraulic clutch that is switched to a forward-driving clutch state, a reverse-driving clutch state, or a neutral state.

The clutch switch unit 13 is connected to a forward-travel switching valve 26 and a reverse-travel switching valve 27 connected via a fluid passage (omitted from illustration) or the like. Each of the forward-travel switching valve 26 and the reverse-travel switching valve 27 is a two-position electromagnetic switching valve, for example. If a solenoid of the forward-travel switching valve 26 is energized, the clutch switch unit 13 is switched to the forward-driving clutch state. If a solenoid of the reverse-travel switching valve 27 is energized, the clutch switch unit 13 is switched to the reverse-driving clutch state. If each of the solenoids of the forward-travel switching valve 26 and the reverse-travel switching valve 27 is deenergized, the clutch switch unit 13 is switched to the neutral state.

The clutch switch unit 13 is switchable by using the clutch switch member 32. If the clutch lever 32B is in the forward-travel position (F), while the solenoid of the forward-travel switching valve 26 is energized, the solenoid of the reverse-travel switching valve 27 remains deenergized, and the clutch switch unit 13 is switched to the forward-driving clutch state. If the clutch lever 32B is in the reverse-travel position (R), while the solenoid of the reverse-travel switching valve 27 is energized, the solenoid of the forward-travel switching valve 26 remains deenergized, and the clutch switch unit 13 is switched to the reverse-driving clutch state. If the clutch lever 32B is in the neutral position (N), the solenoids of the forward-travel switching valve 26 and the reverse-travel switching valve 27 remain deenergized, and the clutch switch unit 13 is switched to the neutral state.

If the clutch pedal 32A is operated in a state where the clutch lever 32B is in the forward-travel position (F) and if the clutch pedal 32A is operated in a state where the clutch lever 32B is in the reverse-travel position (R), either of the solenoids of the forward-travel switching valve 26 and the reverse-travel switching valve 27 is energized, and the clutch switch unit 13 is switched to the neutral state from either of the forward-driving clutch state and the reverse-driving clutch state.

The shuttle shaft 12 is connected to the propeller shaft 5a. Power of the propeller shaft 5a is transmitted to the main transmission unit 5b and the sub-transmission unit 5c, and power output from the sub-transmission unit 5c is transmitted to a rear-wheel differential 20R. The rear-wheel differential 20R rotatably supports a rear axle 21R to which the rear wheels 7R are attached. That is, if the clutch switch unit 13 is switched to either of the forward-driving clutch state and the reverse-driving clutch state and the clutch pedal 32A is not operated, the traveling clutch 5d is in the connected state and transmits power to the traveling device 7 (the front wheels 7F and the rear wheels 7R). If the clutch switch unit 13 is switched to the neutral state, the traveling clutch 5d is in the disconnected state and disconnects transmission of power to the traveling device 7.

The PTO power transmission unit 5e has a PTO propeller shaft 14 and a PTO clutch 15. The PTO propeller shaft 14 is rotatably supported and can transmit power from the propeller shaft 5a. The PTO propeller shaft 14 is connected to a PTO shaft 16 via a gear or the like. The PTO clutch 15 includes, for example, a hydraulic clutch or the like, and is switched between a state where power of the propeller shaft 5a is transmitted to the PTO propeller shaft 14 and a state where power of the propeller shaft 5a is not transmitted to the PTO propeller shaft 14 by engaging/disengaging of the hydraulic clutch.

As illustrated in FIG. 1, the working vehicle 1 includes a brake device 46. The brake device 46 has a left brake device 46a and a right brake device 46b. Each of the left brake device 46a and the right brake device 46b is a disc-type brake device and is switchable between a brake state for braking and a release state for releasing the brake. The left brake device 46a is provided on the left of the rear axle 21R, while the right brake device 46b is provided on the right of the rear axle 21R. Upon the operator who operates the working vehicle 1 operating (depressing) the brake pedal 31L, a left coupling member 47a coupled to the brake pedal 31L can be moved in a braking direction, and the left brake device 46a can be brought into a brake state. Upon the operator operating (depressing) the brake pedal 31R, a right coupling member 47b coupled to the brake pedal 31R can be moved in a braking direction, and the right brake device 46b can be brought into a brake state.

A left hydraulic actuation unit 48a that is actuated by a hydraulic fluid is coupled to the left coupling member 47a. A left braking valve 49a is connected to the left hydraulic actuation unit 48a via a fluid passage. By actuating the left hydraulic actuation unit 48a by using the left braking valve 49a, the left coupling member 47a can be moved in the braking direction. A right hydraulic actuation unit 48b that is actuated by a hydraulic fluid is coupled to the right coupling member 47b. A right braking valve 49b is connected to the right hydraulic actuation unit 48b via a fluid passage. By actuating the right hydraulic actuation unit 48b by using the right braking valve 49b, the right coupling member 47b can be moved in the braking direction.

In the above manner, by operating the brake pedal 31L and the brake pedal 31R, the left brake device 46a and the right brake device 46b can independently bring the left rear wheel 7R and the right rear wheel 7R into the braking state.

As illustrated in FIG. 2, a plurality of display devices 50 are provided around the operator's seat 10. The plurality of display devices 50 include a first display device 50A provided in front of the operator's seat 10 (the steering wheel 30) and a second display device 50B provided on a side of the operator's seat 10 (the steering wheel 30).

Figure 3:
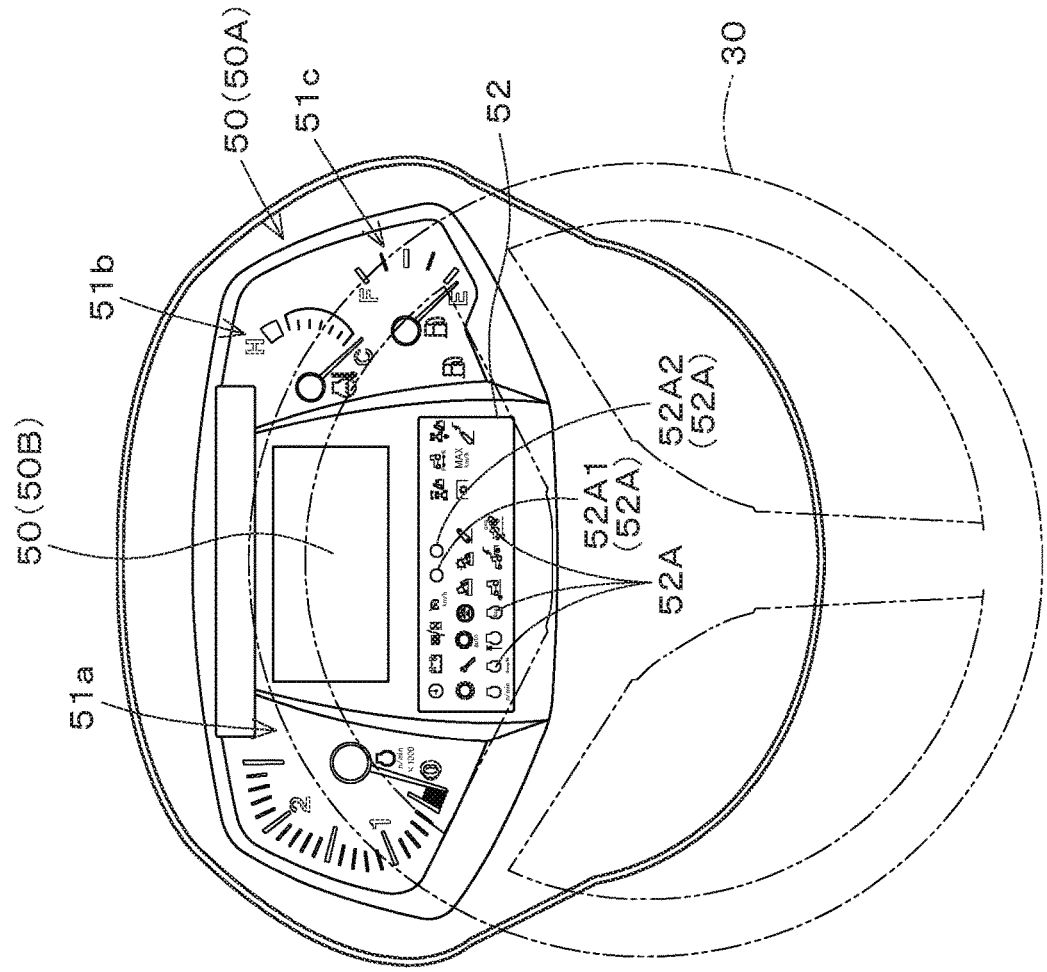
FIG. 3 is a diagram illustrating a first display device.

As illustrated in FIG. 3, the first display device 50A is a meter panel or the like that mainly displays various kinds of driving information and includes a prime mover tachometer 51a that displays the rotation speed of the prime mover 4, a water temperature gauge 51b, and a fuel gauge 51c. The first display device 50A further has a notifier 52 including at least one indicator lamp 52A that notifies various kinds of information by being turned on/off or the like. The first display device 50A illustrated in FIG. 3 is an example and is not limited to the above configuration.

Similarly to the first display device 50A, the second display device 50B is a device that mainly displays various kinds of driving information and includes a display panel 50B1 and a touch panel 50B2 that is disposed on a surface of the display panel 50B1. Various menu items are displayed on the second display device 50B, and various settings of the working vehicle 1 can be performed by a predetermined operation.

As illustrated in FIG. 1, the working vehicle 1 includes a control device 40. The control device 40 includes a central processing unit (CPU), electrical and electronic circuitry, or the like and controls the working vehicle 1 in various manners. The control device 40 includes a change unit 40A and a storage unit 40B. The storage unit 40B is a storage device and stores various control programs and data tables regarding operations of the working vehicle 1. To the control device 40, an accelerator sensor 42a, an ignition switch 42b, a raising/lowering switch 42c, a vehicle speed detection sensor 42d, a brake-operation detection sensor 42e, a clutch lever sensor 42f, a detector 53, and the like are connected. The accelerator sensor 42a detects an operation amount of an accelerator 41a (FIG. 2). The vehicle speed detection sensor 42d detects the vehicle speed (velocity). The brake-operation detection sensor 42e detects an operation amount of the brake operation member 31 (the brake pedal 31L and the brake pedal 31R). The clutch lever sensor 42f detects the position of the clutch lever 32B. The detector 53 detects an operation position of the clutch pedal 32A and outputs a detected value corresponding to the detected operation position.

The detector 53 is, for example, a clutch-operation detection sensor 53a that detects an operation amount of the clutch pedal 32A. The clutch-operation detection sensor 53a is a detection sensor whose detection method is such that a detected value decreases in accordance with the operation amount (depressed amount) of the clutch pedal 32A. For example, in a state where the clutch pedal 32A is depressed to a maximum depression position PMAX (see FIG. 6A described later), the detected voltage value of the clutch-operation detection sensor 53a is "0 volts". Then, as the clutch pedal 32A becomes away from the maximum depression position PMAX, the detected voltage value of the clutch-operation detection sensor 53a increases. Then, in a state where a foot is detached from the clutch pedal 32A, that is, in a state where the clutch pedal 32A is in an unoperated position P0 (see FIG. 6A described later), the detected voltage value of the clutch-operation detection sensor 53a becomes a maximum (e.g., "5 volts").

If the operation amount of the accelerator 41a is detected by the accelerator sensor 42a, the control device 40 changes the rotation speed of the prime mover 4 (referred to as "prime mover rotation speed") in accordance with the operation amount. If the ignition switch 42b is operated to be turned on, the control device 40 starts the prime mover 4 through a predetermined process; if the ignition switch 42b is operated to be turned off, the control device 40 stops driving the prime mover 4.

If the raising/lowering switch 42c is operated in a raising direction, the control device 40 controls a control valve to extend a lift cylinder and to raise the working device 2. If the raising/lowering switch 42c is operated in a lowering direction, the control device 40 controls the control valve to contract the lift cylinder to lower the working device 2.

The control device 40 performs a brake control on the basis of the brake-operation detection sensor 42e. During the brake control, upon the brake-operation detection sensor 42e detecting an operation on the brake pedal 31L, the control device 40 actuates the left hydraulic actuation unit 48a to operate the left brake device 46a for braking. In addition, during the brake control, upon the brake-operation detection sensor 42e detecting an operation on the brake pedal 31R, the control device 40 actuates the right hydraulic actuation unit 48b to operate the right brake device 46b for braking. Furthermore, during the brake control, upon the brake-operation detection sensor 42e detecting operations on the brake pedal 31L and the brake pedal 31R, the control device 40 actuates the left hydraulic actuation unit 48a and the right hydraulic actuation unit 48b to operate the left brake device 46a and the right brake device 46b for braking.

Upon the clutch lever sensor 42f detecting that the clutch lever 32B has been switched to the forward-travel position (F), the control device 40 energizes the solenoid of the forward-travel switching valve 26 to switch the clutch switch unit 13 to the forward-driving clutch state. Upon the clutch lever sensor 42f detecting that the clutch lever 32B has been switched to the reverse-travel position (R), the control device 40 energizes the solenoid of the reverse-travel switching valve 27 to switch the clutch switch unit 13 to the reverse-driving clutch state. Upon the clutch lever sensor 42f detecting that the clutch lever 32B has been switched to the neutral position (N), the control device 40 deenergizes the solenoids of the forward-travel switching valve 26 and the reverse-travel switching valve 27 to switch the clutch switch unit 13 to the neutral state.

If a detected value from the detector 53 (the clutch-operation detection sensor 53a) (e.g., detected voltage value) corresponds with a predetermined threshold (e.g., threshold voltage), the control device 40 brings the traveling clutch 5d into the half-clutch state. If the detected value is less than the threshold, the control device 40 brings the traveling clutch 5d into the disconnected state. If the detected value exceeds the threshold, the control device 40 brings the traveling clutch 5d into the connected state.

For example, if the operator depresses the clutch pedal 32A to the maximum depression position PMAX, the detected voltage value from the clutch-operation detection sensor 53a exceeds the threshold voltage, and thus, the control device 40 brings the traveling clutch 5d into the disconnected state. Then, if the operator restores the clutch pedal 32A from the maximum depression position PMAX to a position denoting the half-clutch state, the detected voltage value from the clutch-operation detection sensor 53a corresponds with the threshold voltage, and thus, the control device 40 brings the traveling clutch 5d into the half-clutch state. Then, if the operator further restores the clutch pedal 32A, the detected voltage value from the clutch-operation detection sensor 53a becomes less than the threshold voltage, and thus, the control device 40 brings the traveling clutch 5d into the connected state. In the above manner, the operator performs a series of operations of depressing the clutch pedal 32A to the maximum depression position PMAX and then restoring the clutch pedal 32A to the position denoting the half-clutch state and further restoring the clutch pedal 32A to the unoperated position P0.

The working vehicle 1 according to this embodiment can change a half-clutch stroke length of the clutch pedal 32A. Note that the half-clutch stroke length is the length of displacement of the clutch pedal 32A from the maximum depression position PMAX, in which the clutch pedal 32A is operated so that the traveling clutch 5d is brought into the disconnected state, to the operation position of the clutch pedal 32A, in which the traveling clutch 5d is brought into the half-clutch state.

The clutch lever 32B (operation lever) includes an operation member 45 that is operable by the operator or the like. The operation member 45 is a dial switch 45a, for example, provided at the tip of the clutch lever 32B and rotatable around the longitudinal direction of the clutch lever 32B as an axial center.

As illustrated in FIG. 2, an armrest 18 is provided on the right of the operator's seat 10. The armrest 18 extends in the front-back direction of the operator's seat 10. The operator can operate the steering wheel 30 with the right arm rested on the armrest 18. On the right side surface of the armrest 18, a second operation member 54 is provided. The second operation member 54 is different from the operation member 45 disposed on the clutch lever 32B and serving as a first operation member. The second operation member 54 is a sensitivity setting button 54a, for example. The sensitivity setting button 54a is a push-button switch, for example. The sensitivity setting button 54a is an operation switch that is turned on while the operator or the like is operating it and is turned off while the operator or the like is not performing it.

As illustrated in FIG. 1, the control device 40 includes the change unit 40A. The control device 40 functions as the change unit 40A by, for example, the CPU executing a control program stored in the storage unit 40B. The change unit 40A changes the value of the threshold voltage (threshold) to a different value in accordance with an operation on the operation member 45.

Specifically, if the clutch pedal 32A is in the maximum depression position PMAX (i.e., maximum operation position), the detector 53 outputs a predetermined first detected value (e.g., minimum, which is "0 volts") as the detected value; if the clutch pedal 32A is in the unoperated position P0, where no operation is performed, the detector 53 outputs a predetermined second detected value (e.g., maximum, which is "5 volts"), which is a value separated from the first detected value by a certain value range, as the detected value. The threshold voltage is a predetermined single value among a plurality of values that are present between the first detected value (0 volts) and the second detected value (5 volts). The threshold voltage is set to, for example, 2.5 volts as a default value (initial value).

If the second operation member 54 and the operation member 45 are operated (e.g., if the dial switch 45a is operated while the sensitivity setting button 54a is pressed), in accordance with the operation on the dial switch 45a, the change unit 40A can change the value of the threshold to a value (e.g., 1 volt) closer to the first detected value (0 volts) than the default value (2.5 volts) is or a value (e.g., 4 volts) closer to the second detected value (5 volts) than the default value (2.5 volts) is. Note that the first detected value, the second detected value, the value of the threshold, and the changed value of the threshold are not limited to the above values and may be values other than the above values.

Here, a sensitivity setting process performed by the control device 40 will be described with reference to FIG. 4. Upon determining that the sensitivity setting button 54a is operated (Yes in S1), the control device 40 changes a mode of the working vehicle 1 from a normal mode to a setting changing mode. The setting changing mode is maintained throughout the operation on the sensitivity setting button 54a by an operator or the like. Upon the operator or the like stopping the operation on the sensitivity setting button 54a, the control device 40 returns the mode of the working vehicle 1 from the setting changing mode to the normal mode. On the other hand, as long as the operator or the like does not operate the sensitivity setting button 54a (No in S1), the control device 40 ends this process without changing the mode of the working vehicle 1 to the setting changing mode.

Figure 5A:
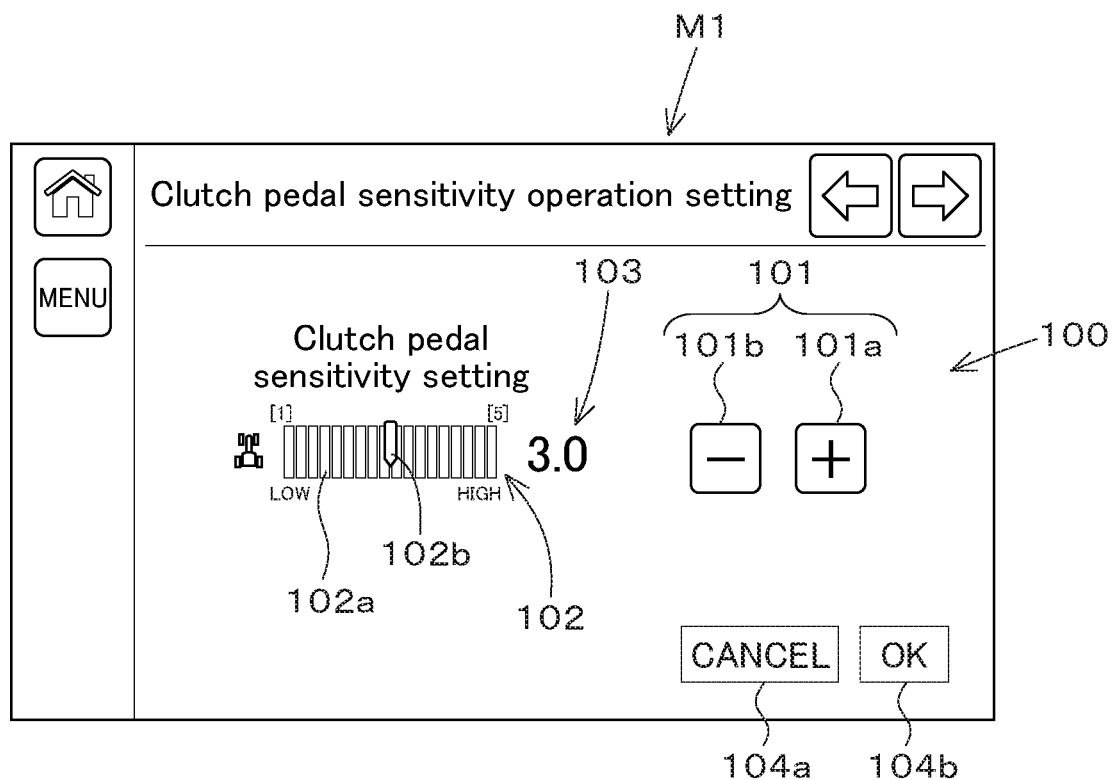
FIG. 5A is a diagram illustrating an example of a setting screen.

If the mode of the working vehicle 1 is the setting changing mode, the change unit 40A executes sensitivity setting for changing the value of the threshold voltage (threshold) to a different value in accordance with the operation on the operation member 45 (the dial switch 45a) (S2). Specifically, as illustrated in FIG. 5A, the control device 40 causes the second display device 50B to display a setting screen M1 for setting the sensitivity of the clutch pedal 32A. In FIG. 5A, it is assumed that the sensitivity "3" (default value) of the clutch pedal 32A is indicated. In accordance with the operation on the dial switch 45a provided on the clutch lever 32B (operation lever), the change unit 40A changes the sensitivity of the clutch pedal 32A. In this embodiment, the sensitivity of the clutch pedal 32A is changeable within a predetermined range (range of sensitivity from "1" to "5") in units of one decimal place.

Figure 5B:
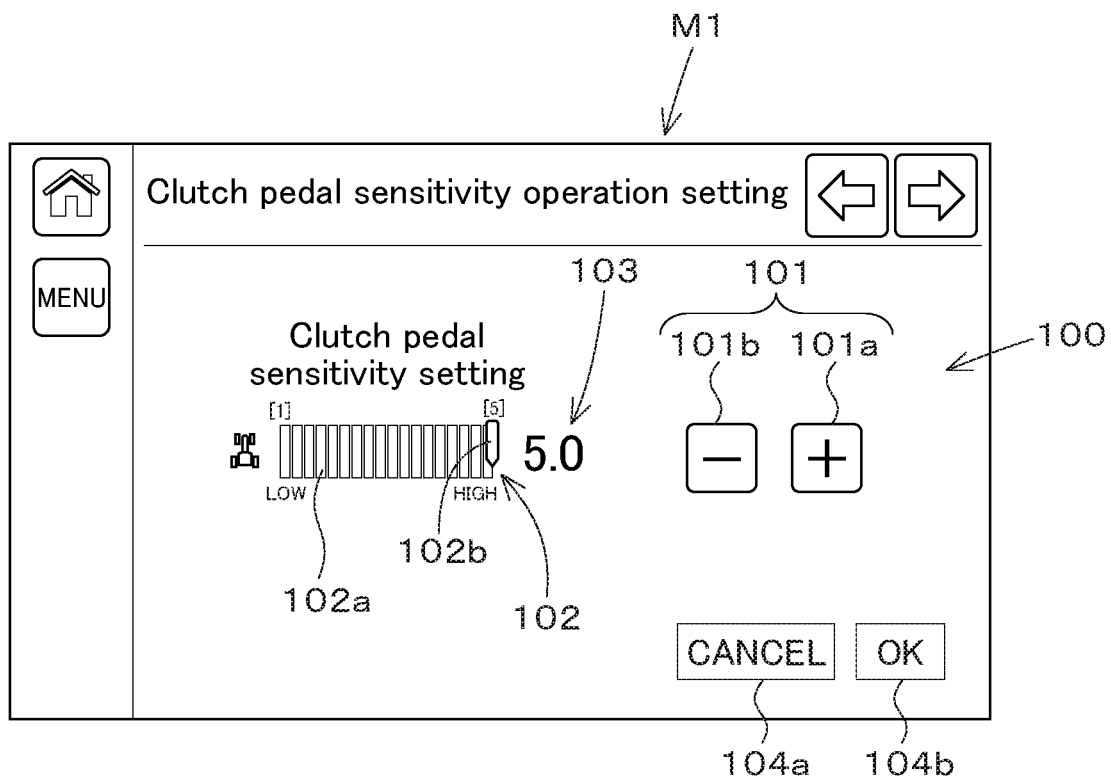
FIG. 5B is a diagram illustrating an example of the setting screen.

If the operator or the like rotates the dial switch 45a to the back (i.e., counterclockwise in a left side view of the clutch lever 32B), the sensitivity of the clutch pedal 32A is increased. The sensitivity of the clutch pedal 32A is displayed in an indicator portion 102b and a numerical value display portion 103. On the other hand, if the operator or the like rotates the dial switch 45a to the front (i.e., clockwise in a left side view of the clutch lever 32B), the sensitivity of the clutch pedal 32A is decreased. In FIG. 5B, the sensitivity of the clutch pedal 32A is set to the maximum "5". Upon a button 104b indicating "OK" being touched in this state, if the mode of the working vehicle 1 is the setting changing mode, the change unit 40A changes the sensitivity from "3" to "5", changes the value of the threshold voltage from the threshold voltage corresponding to the sensitivity "3" to a threshold voltage corresponding to the sensitivity "5", and stores the changed sensitivity and the changed value of the threshold voltage in the storage unit 40B. Subsequently, the control device 40 restores the mode of the working vehicle 1 from the setting changing mode to the normal mode and ends this process. In addition, upon a button 104a indicating "CANCEL" being touched in a state where the setting screen M1 illustrated in FIG. 5B is displayed, the change unit 40A displays the unchanged sensitivity (the sensitivity "3" illustrated in FIG. 5A in this example) without changing the sensitivity to "5", and the control device 40 returns the mode of the working vehicle 1 from the setting changing mode to the normal mode and ends this process. The storage unit 40B maintains the unchanged sensitivity and the unchanged value of the threshold voltage.

Figure 6A:
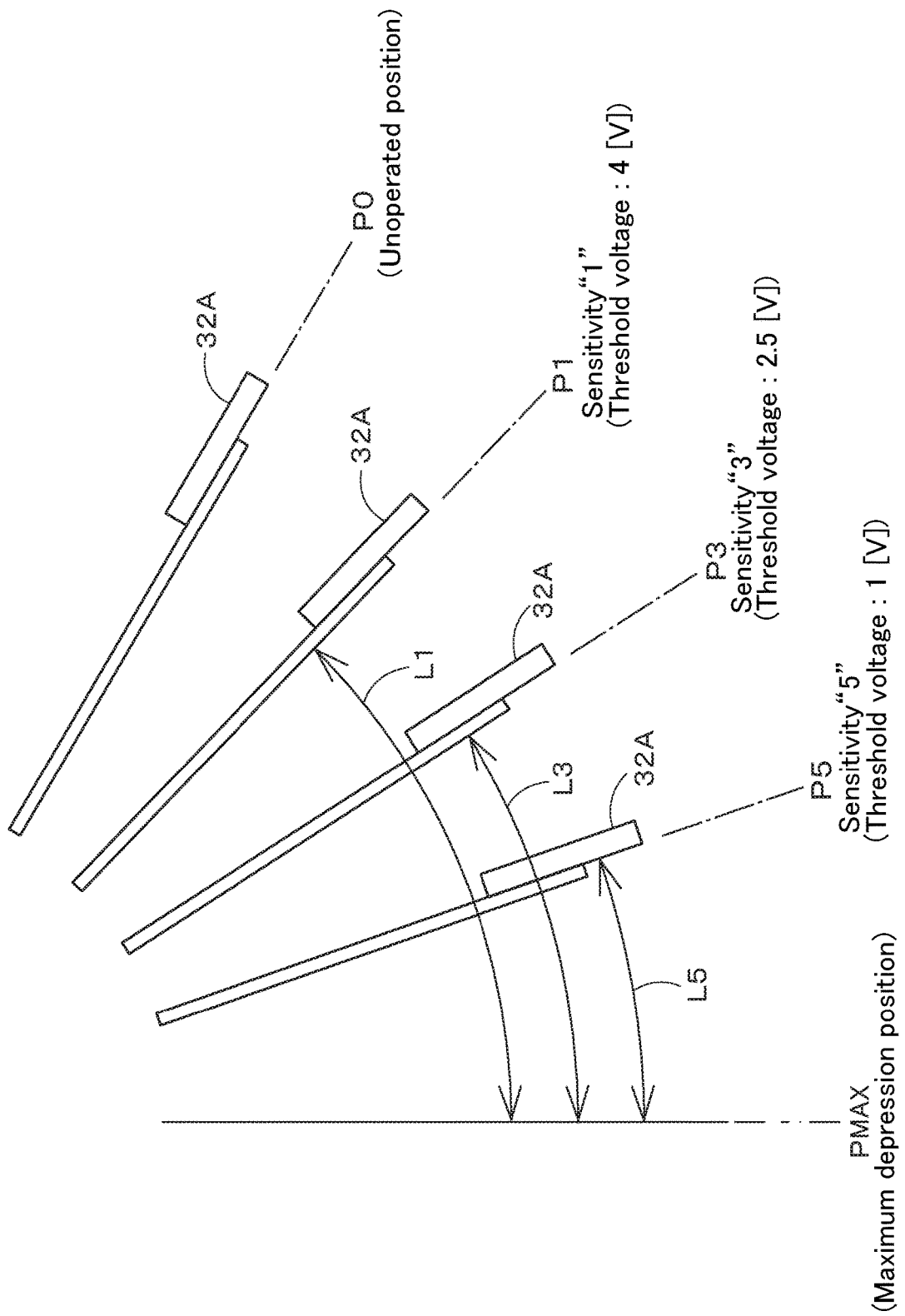
FIG. 6A is a diagram illustrating that a stroke length of a clutch pedal is changeable by changing a sensitivity or a threshold voltage.

As illustrated in FIG. 6A and FIG. 6C, the sensitivity "3" and the value of the threshold voltage "2.5 volts" are associated with each other in advance. In this case, the stroke length of the clutch pedal 32A is a length L3. This means that the detected voltage value of the clutch-operation detection sensor 53a when the clutch pedal 32A is set in a position P3 by being restored from the maximum depression position PMAX by the length L3 is "2.5 volts", the detected voltage value corresponds with the threshold voltage, and the traveling clutch 5d is brought into the half-clutch state. The position of the clutch pedal 32A in which the traveling clutch 5d is brought into the half-clutch state is the position of the length L3. That is, the stroke length of the clutch pedal 32A is the length L3.

In addition, the sensitivity "5" and the value of the threshold voltage "1 volt" are associated with each other in advance. In this case, the stroke length of the clutch pedal 32A is a length L5. This means that the detected voltage value of the clutch-operation detection sensor 53a when the clutch pedal 32A is set in a position P5 by being restored from the maximum depression position PMAX by the length L5 is "1 volt", the detected voltage value corresponds with the threshold voltage, and the traveling clutch 5d is brought into the half-clutch state. The position of the clutch pedal 32A in which the traveling clutch 5d is brought into the half-clutch state is the position of the length L5. That is, the stroke length of the clutch pedal 32A is the length L5.

Furthermore, the sensitivity "1" and the value of the threshold voltage "4 volts" are associated with each other in advance. In this case, the stroke length of the clutch pedal 32A is a length L1. This means that the detected voltage value of the clutch-operation detection sensor 53a when the clutch pedal 32A is set in a position P1 by being restored from the maximum depression position PMAX by the length L1 is "4 volts", the detected voltage value corresponds with the threshold voltage, and the traveling clutch 5d is brought into the half-clutch state. The position of the clutch pedal 32A in which the traveling clutch 5d is brought into the half-clutch state is the position of the length L1. That is, the stroke length of the clutch pedal 32A is the length L1.

The above three stroke lengths have the relationship of "L5<L3<L1". In addition, within the sensitivity range from "1" to "5", the threshold voltage is also associated with each of the sensitivities other than the sensitivities "1", "3", and "5" in advance, and the stroke length of the clutch pedal 32A is a corresponding length. That is, the sensitivity, the threshold voltage, and the stroke length have a relationship (proportional relationship) such that the threshold voltage and the stroke length are decreased as the sensitivity is increased.

Figure 6B:
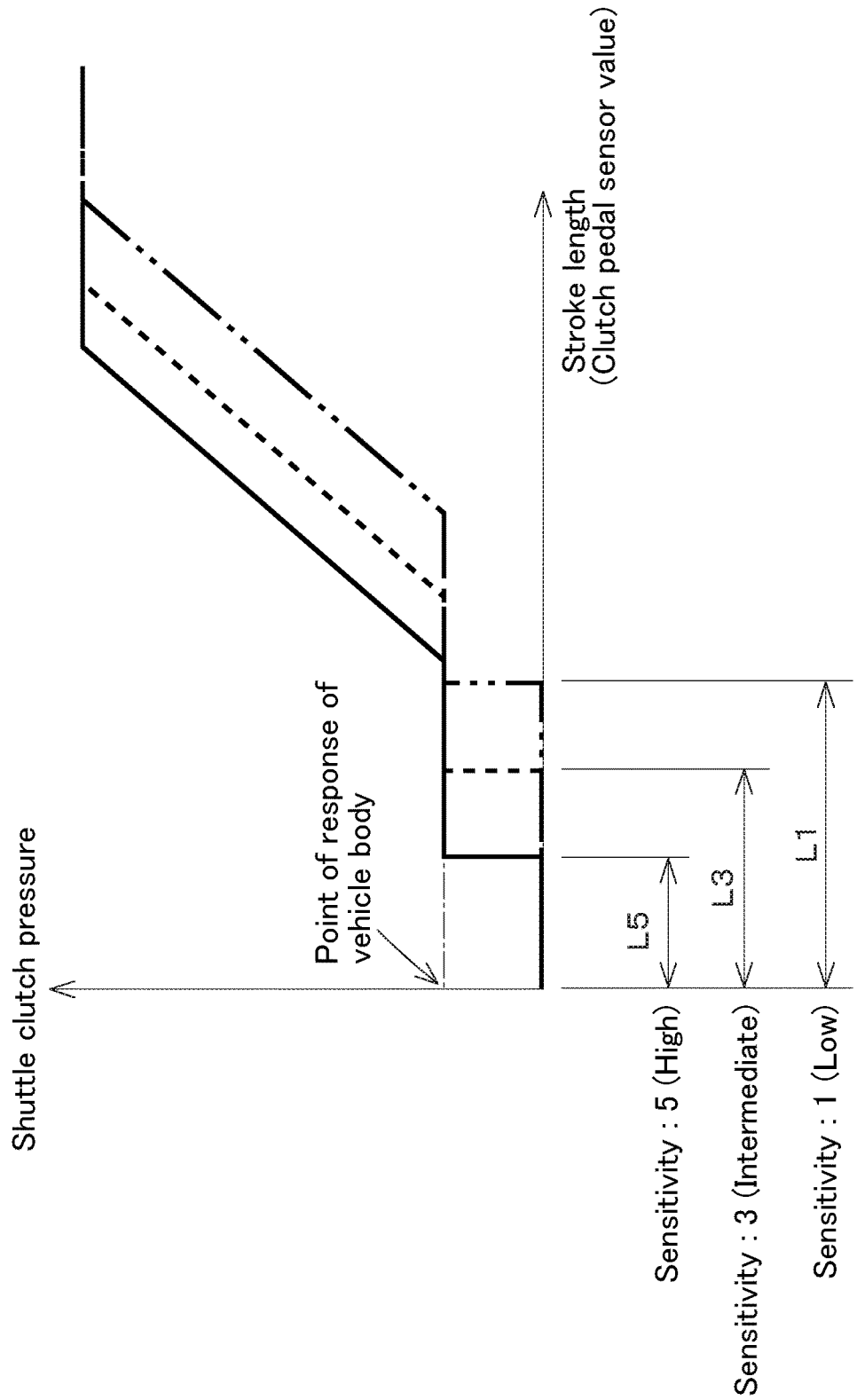
FIG. 6B is a diagram illustrating a relationship between the stroke length and a shuttle clutch pressure.

As illustrated in FIG. 6B, if the sensitivity is "3" (default value), the threshold voltage is 2.5 volts and the stroke length of the clutch pedal 32A is the length L3. However, if the sensitivity is changed to "5", the threshold voltage becomes 1 volt, and the stroke length of the clutch pedal 32A becomes the length L5. Thus, the stroke length is decreased, and the response of the vehicle body 3 is faster. On the other hand, if the sensitivity is changed to "1", the threshold voltage becomes 4 volts, and the stroke length of the clutch pedal 32A becomes the length L1. Thus, the stroke length is increased, and the response of the vehicle body 3 is slower. The stroke length of the clutch pedal 32A differs depending on the operator's preference. For example, operators with driving skills may prefer a short stroke length. On the other hand, novice operators may prefer a long stroke length. By changing the sensitivity of the clutch pedal 32A in the above manner, the stroke length of the clutch pedal 32A can be changed in accordance with the operator's preference.

The storage unit 40B stores the relationship among the sensitivity, the threshold voltage, and the stroke length of the clutch pedal 32A illustrated in FIG. 6C in advance. Note that the storage unit 40B may store the relationship between the sensitivity and the threshold voltage and does not necessarily store the stroke length of the clutch pedal 32A.

Since the second display device 50B has a touch panel function, the sensitivity of the clutch pedal 32A can be set thereon. As illustrated in FIG. 5A, the second display device 50B displays a sensitivity input portion 100 on the setting screen M1. The sensitivity input portion 100 is a portion where the sensitivity of the clutch pedal 32A is input and has a button input portion 101, a slide input portion 102, and the numerical value display portion 103. The button input portion 101 is a portion where the sensitivity of the clutch pedal 32A is input by a pressing operation and includes an increase input portion 101a for increasing the sensitivity and a decrease input portion 101b for decreasing the sensitivity. The slide input portion 102 is a portion where the sensitivity is input by a sliding operation and includes a scale portion 102a and the indicator portion 102b.

The scale portion 102a is a scale indicating the magnitude of the sensitivity and includes, for example, a plurality of vertical bars (gauges) arranged side by side horizontally. In the scale portion 102a, one end of the arranged vertical bars is the minimum, while the other end of the arranged vertical bars is the maximum. For example, the left end is the minimum, while the right end is the maximum. The indicator portion 102b is a portion that indicates the sensitivity on the scale portion 102a and can move in the arrangement direction of the vertical bars. The indicator portion 102b can move in response to a touch operation or the like along the scale portion 102a. In addition, the indicator portion 102b moves along the scale portion 102a in conjunction with the sensitivity input in the button input portion 101. For example, if the sensitivity is increased in the increase input portion 101a, the indicator portion 102b moves in the increasing direction along the scale portion 102a. If the sensitivity is decreased in the decrease input portion 101b, the indicator portion 102b moves in the decreasing direction along the scale portion 102a. The numerical value display portion 103 displays the sensitivity set in the button input portion 101 and the slide input portion 102 as numerical values.

Note that a lower limit and an upper limit of the sensitivity are set in advance in the sensitivity input portion 100, and it is not possible to set the sensitivity to values lower than the predetermined lower limit and values higher than the predetermined upper limit. For example, the lower limit of the sensitivity is set to "1", while the upper limit of the sensitivity is set to "5".

Figure 5C:
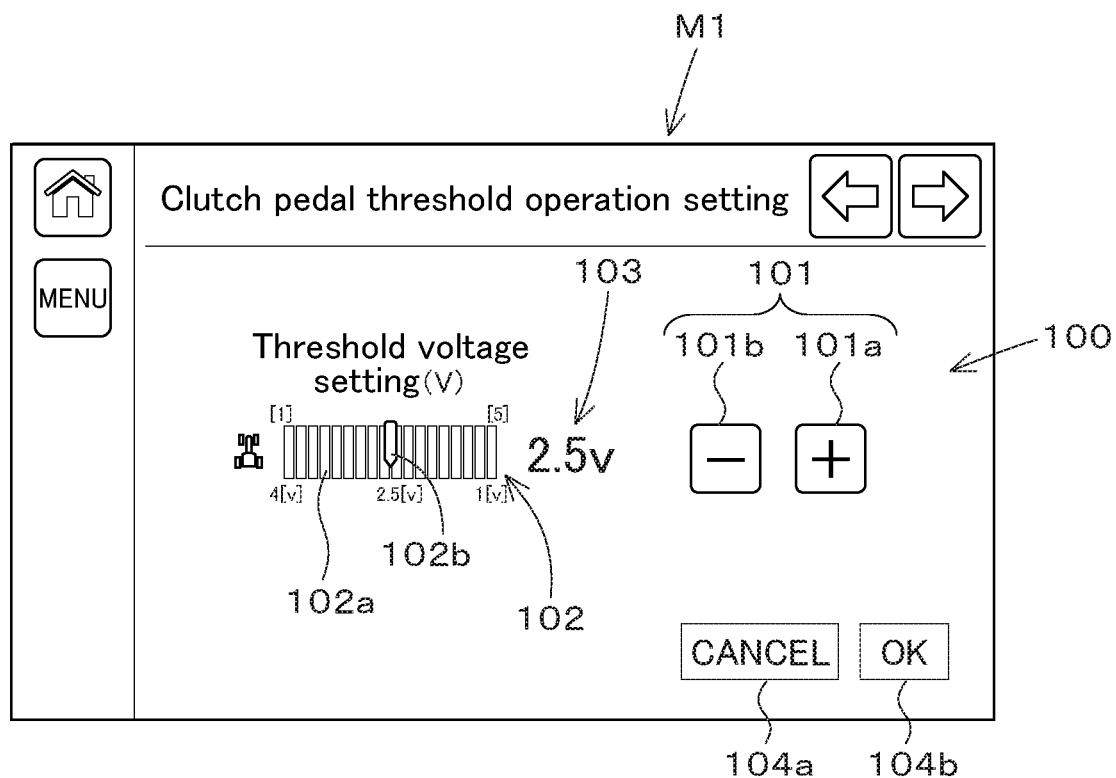
FIG. 5C is a diagram illustrating an example of the setting screen.
Figure 5D:
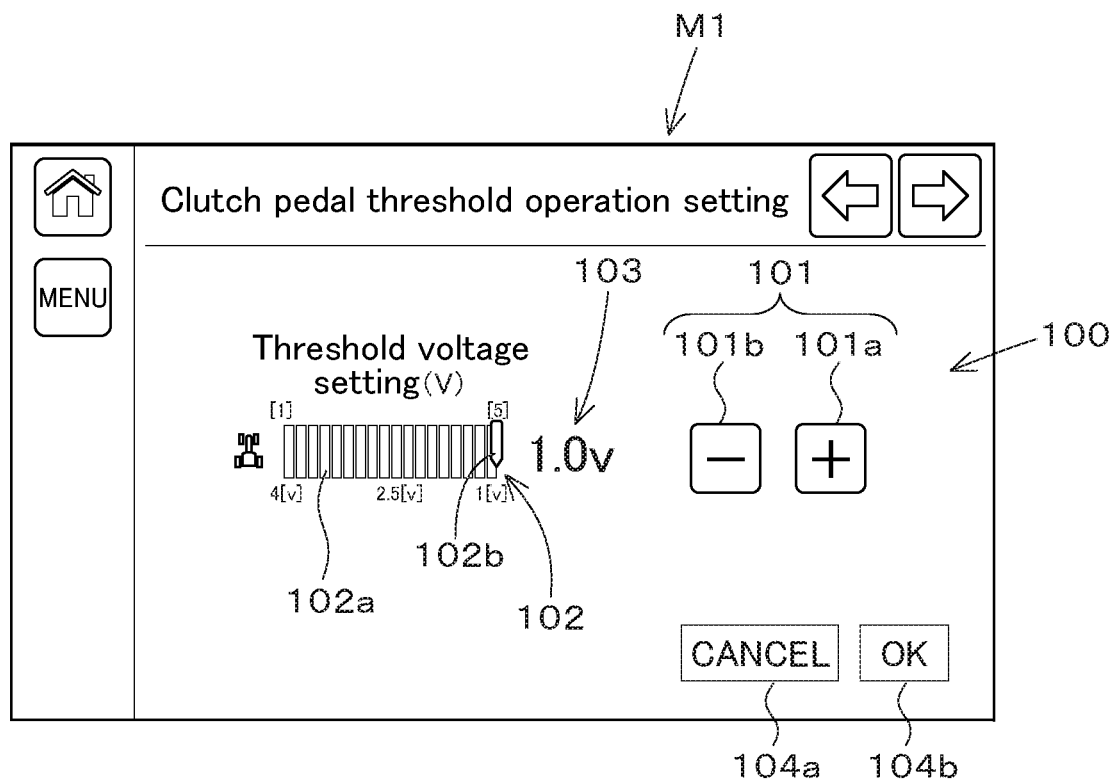
FIG. 5D is a diagram illustrating an example of the setting screen.

Although the control device 40 causes the second display device 50B to display the setting screen M1 illustrated in FIG. 5A and FIG. 5B, that is, a screen for setting the sensitivity of the clutch pedal 32A, the control device 40 may also cause the second display device 50B to display the setting screen M1 for setting the threshold voltage of the clutch pedal 32A as illustrated in FIG. 5C and FIG. 5D. For example, the default value of the threshold voltage is set to "2.5 volts", the lower limit of the threshold voltage is set to "1 volt", and the upper limit of the threshold voltage is set to "4 volts".

Figure 4:
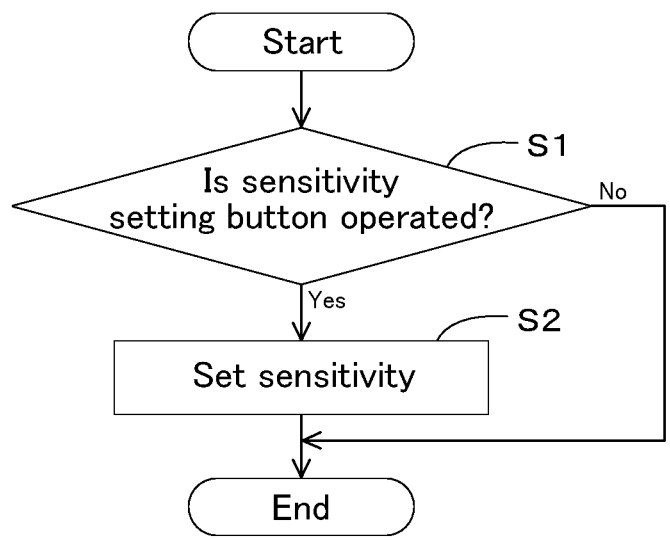
FIG. 4 is a flowchart illustrating an example of a sensitivity setting process.

Note that the control device 40 may further cause the stroke length of the clutch pedal 32A illustrated in FIG. 6A to be displayed on the setting screen M1 illustrated in FIG. 5A in the sensitivity setting (S2) illustrated in FIG. 4. That is, the control device 40 causes the sensitivity setting of the clutch pedal 32A and the stroke length of the clutch pedal 32A illustrated in FIG. 6A to be displayed in association with each other. For example, if the sensitivity is "3" as illustrated in FIG. 5A, as illustrated in FIG. 6A, in the range from the unoperated position P0 to the maximum depression position PMAX, an image of the clutch pedal 32A in a state where the stroke length is the length L3 and supplementary information thereof (information indicating the sensitivity "3", the value of the threshold voltage (2.5 volts), and the position P3) are displayed on the setting screen M1 of the second display device 50B. Then, in conjunction with the change in the sensitivity setting of the clutch pedal 32A, the control device 40 causes an image of the clutch pedal 32A in a state where the stroke length is changed and the supplementary information thereof to be displayed on the setting screen M1. For example, if the sensitivity is changed to "5" as illustrated in FIG. 5B, an image of the clutch pedal 32A in a state where the stroke length is the length L5 illustrated in FIG. 6A and related information (information indicating the sensitivity "5", the value of the threshold voltage (1 volt), and the position P5) are displayed on the setting screen M1 of the second display device 50B. In this case, it becomes easier to grasp a correspondence between the sensitivity setting of the clutch pedal 32A and the stroke length, and thus, the sensitivity can be set easier.

The control device 40 can perform automatic switch control. The automatic switch control is disconnection control (first process) for switching the traveling clutch 5d from the connected state to the disconnected state in accordance with an operation on the brake operation member 31 (the brake pedal 31L and the brake pedal 31R). That is, in a situation where the traveling clutch 5d is switched to the forward-driving clutch state and in a situation where the traveling clutch 5d is switched to the reverse-driving clutch state, the automatic switch control can switch the traveling clutch 5d to the disconnected state by using the brake operation member 31 for braking.

A switching unit 43 that selects whether the automatic switch control is valid or invalid is connected to the control device 40. The switching unit 43 includes a switch 44. The switch 44 is provided around the operator's seat 10 and can be turned on/off. If at least the automatic switch control is invalid, by turning on the switch 44 from off state, the automatic switch control is switched from invalid to valid. The clutch pedal 32A is part of the switching unit 43, and if at least the automatic switch control is valid, by operating the switching unit 43, the automatic switch control is switched from valid to invalid.

Whether the automatic switch control is valid or invalid can be displayed on either of the first display device 50A and the second display device 50B. As illustrated in FIG. 3, for example, among a plurality of indicator lamps 52A of the notifier 52, a first indicator lamp 52A1 corresponding to the automatic switch control is turned on while the automatic switch control is valid and is turned off while the automatic switch control is invalid. Alternatively, on the second display device 50B, a display portion on a predetermined screen corresponding to the automatic switch control is turned on while the automatic switch control is valid and is turned off while the automatic switch control is invalid.

The control device 40 performs the first process (disconnection control) as the automatic switch control. During the first process, when an operation amount (depressed amount) W1 of each of the brake pedal 31L and the brake pedal 31R is greater than or equal to a predetermined threshold E2, the control device 40 performs the first process. If the operation amount (depressed amount) W1 is less than the threshold E2, the control device 40 does not perform the first process. The storage unit 40B stores the threshold E2 of the operation amount (depressed amount) W1 of each of the brake pedal 31L and the brake pedal 31R in advance.

If the first process is performed, the notifier 52 notifies that the first process is performed. For example, among the plurality of indicator lamps 52A of the notifier 52, a second indicator lamp 52A2 corresponding to the automatic switch control is turned on when the first process is performed and is turned off when the first process is not performed. Thus, since the first display device 50A has the first indicator lamp 52A1 and the second indicator lamp 52A2, whether the automatic switch control is valid or invalid can be displayed and whether the first process is performed can be displayed.

Figure 7A:
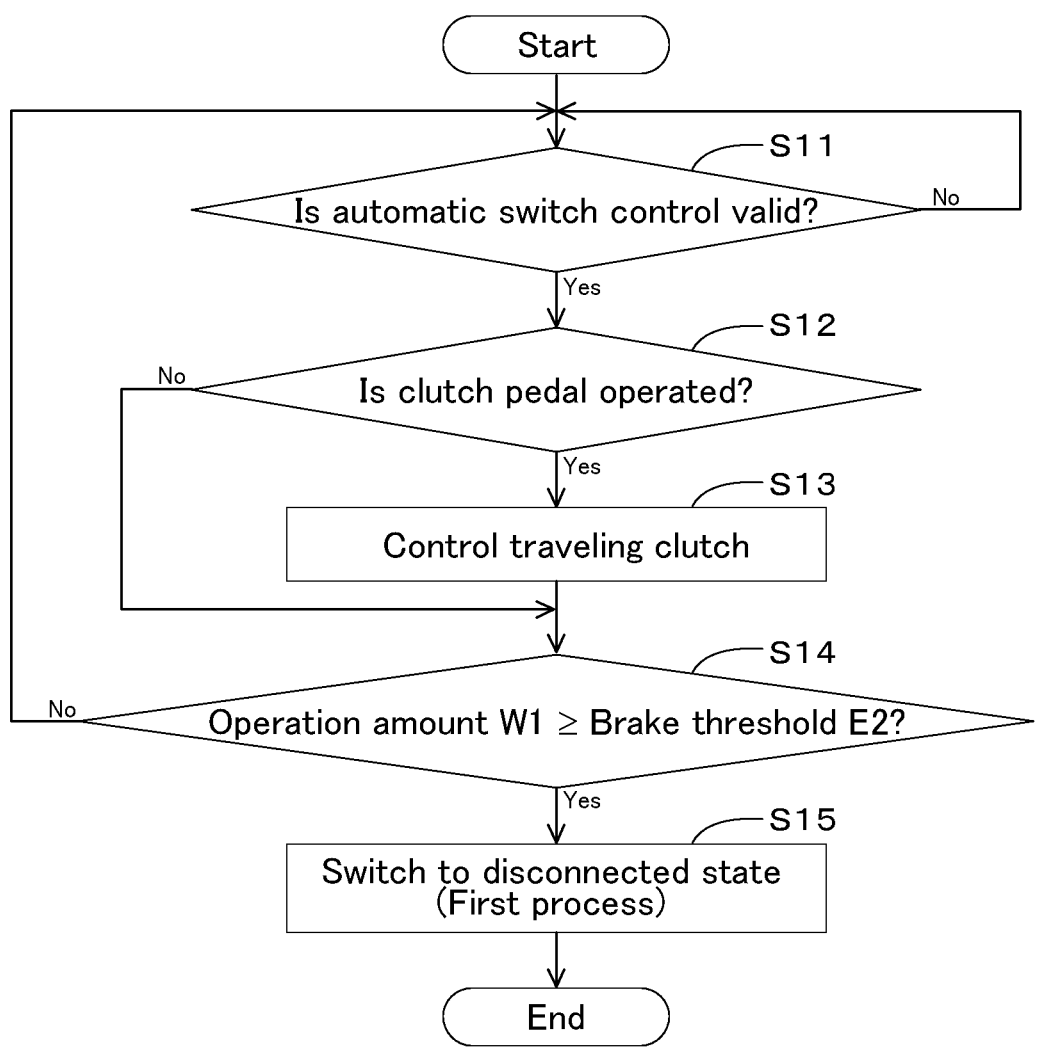
FIG. 7A is a flowchart up to a first process in automatic switch control.
Figure 7B:
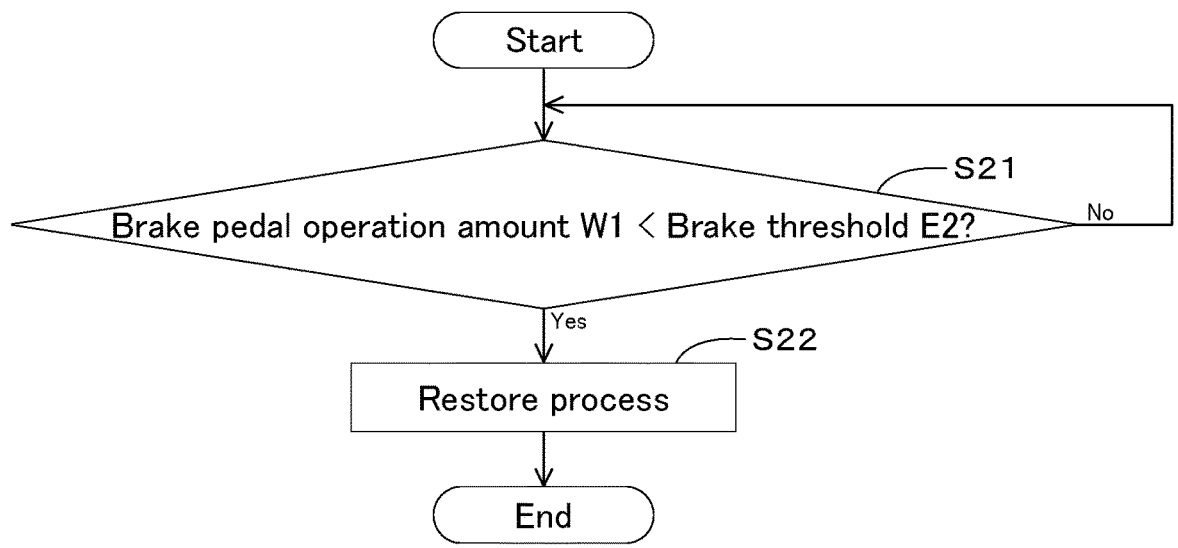
FIG. 7B is a flowchart of an operation performed when a brake pedal is operated after the first process.
Figure 7C:
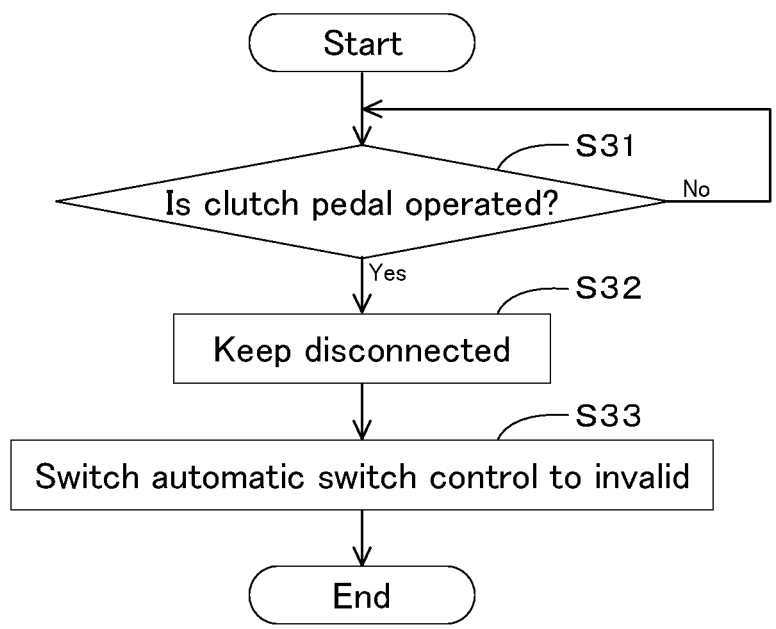
FIG. 7C is a flowchart of an operation performed when the clutch pedal is operated after the first process.

FIG. 7A to FIG. 7C are flowcharts of the automatic switch control and the like performed by the control device 40.

As illustrated in FIG. 7A, in a situation where the clutch pedal 32A is not operated and the clutch lever 32B is switched to either of the forward-travel position (F) and the reverse-travel position (R), the control device 40 determines whether the automatic switch control is valid (S11). If the automatic switch control is valid (Yes in S11), the control device 40 determines whether the clutch pedal 32A is operated (S12). If the clutch pedal 32A is operated (Yes in S12), the control device 40 controls the traveling clutch 5d (S13). The control device 40 determines whether the operation amount W1 of the brake pedal (each of the brake pedal 31L and the brake pedal 31R) is greater than or equal to the threshold E2 (S14). If the operation amount W1 is greater than or equal to the threshold E2 (Yes in S14), the control device 40 performs the first process for switching the traveling clutch 5d from the connected state to the disconnected state (S15). If the first process is performed, the control device 40 temporarily stores the position of the clutch lever 32B prior to the first process (position storing process). On the other hand, if the operation amount W1 is not greater than or equal to the threshold E2 (No in S14), the process returns to S11.

After the first process is performed, the control device 40 advances to a post-disconnection process illustrated in FIG. 7B and FIG. 7C. As illustrated in FIG. 7B, during the post-disconnection process, the control device 40 determines whether the operation amount W1 of the brake pedal becomes less than the threshold E2 (S21: brake pedal determination). In S21 (brake pedal determination), for example, after the first process (S15) is performed in a state where the brake pedal is depressed, the control device 40 determines whether depression of the brake pedal is released, that is, whether the brake pedal is released. If the operation amount W1 of the brake pedal becomes less than the threshold E2 by releasing the brake pedal or the like (Yes in S21), the control device 40 performs a restore process (S22) for restoring the traveling clutch 5d to the state prior to the first process. On the other hand, if the operation amount W1 is greater than or equal to the threshold E2 (No in S21), the process returns to S21. In S22 (restore process), if the clutch lever 32B in the forward-travel position (F) is stored in the position storing process, the control device 40 restores the traveling clutch 5d to the forward-driving clutch state; if the clutch lever 32B in the reverse-travel position (R) is stored in the position storing process, the control device 40 restores the traveling clutch 5d to the reverse-driving clutch state. Here, in restoring the traveling clutch 5d to the forward-driving clutch state or the reverse-driving clutch state, the control device 40 performs connection control for switching the traveling clutch 5d to the connected state through the half-clutch state by using the threshold with the default value (e.g., the threshold voltage is 2.5 volts: the sensitivity "3") if the threshold is not changed, or by using the threshold whose value is changed by the change unit 40A (e.g., the threshold voltage is 1 volt: the sensitivity "5" or the threshold voltage is 4 volts: the sensitivity "1"). Although the series of operations by the operator on the clutch pedal 32A are not performed here, the control device 40 performs control as if the detected voltage value of the clutch-operation detection sensor 53a corresponds with and exceeds the threshold with the default value or the changed threshold.

As illustrated in FIG. 7C, the control device 40 determines whether the clutch pedal 32A is operated (S31: clutch pedal determination). In S31 (clutch pedal determination), for example, after the first process is performed (after S15) in a state where the clutch pedal 32A is not depressed, the control device 40 determines whether the clutch pedal 32A is depressed.

If the clutch pedal 32A is changed from a released state to a depressed state (Yes in S31) in S31 (clutch pedal determination), the control device 40 keeps the disconnected state of the traveling clutch 5d (S32) and switches the automatic switch control from valid to invalid (S33). On the other hand, if the clutch pedal 32A is not operated (No in S31), the process returns to S31.

If the automatic switch control is not valid (No in S11) in S11 in FIG. 7A, the process returns to S11, and thus, the automatic switch control is not performed. If the automatic switch control is not valid (No in S11), the control device 40 may end this process and may skip S12 to S15 in FIG. 7A and the processes in FIG. 7B and FIG. 7C.

FIG. 8A and FIG. 8B are diagrams illustrating an overall relationship among whether the automatic switch control is valid/invalid, the position of the clutch lever 32B, the operation on the clutch pedal 32A, the operation on the brake pedals 31L and 31R, and the like.

For the convenience of description, a state where the clutch lever 32B is switched to either of the forward-travel position (F) and the reverse-travel position (R) is referred to as "forward-travel/reverse-travel period". In addition, "OFF" of the clutch pedal 32A indicates that the operation amount of the clutch pedal 32A is less than a predetermined amount (less than the threshold) and indicates, for example, an unoperated state. "ON" of the clutch pedal 32A indicates that the operation amount of the clutch pedal 32A is greater than or equal to the predetermined amount (greater than or equal to the threshold) and indicates, for example, a depressed state. "OFF" of the brake pedal indicates that the operation amount W1 of the brake pedal is less than the threshold E2 and indicates, for example, a released state. "ON" of the brake pedal indicates that the operation amount W1 of the brake pedal is greater than or equal to the threshold E2, and indicates, for example, a depressed state. In FIG. 8B, a previous state indicates a state when an initial operation is performed, while a subsequent state indicates a state when the clutch pedal 32A, the brake pedal, or the like is operated after the previous state.

In FIG. 8A and FIG. 8B, "connected" indicates that the traveling clutch 5d is in the connected state, while "disconnected" means that the traveling clutch 5d is in the disconnected state. In addition, "keep disconnected" indicates that the disconnected state is kept in the subsequent state if at least the traveling clutch 5d is brought into the disconnected state in the previous state. Furthermore, "keep connected" indicates that the connected state is kept in the subsequent state if at least the traveling clutch 5d is brought into the connected state in the previous state. "Keep valid" indicates that the automatic switch control is kept valid in the subsequent state if at least the automatic switch control is valid in the previous state. "Switch to invalid" indicates that the automatic switch control is switched from valid to invalid in the subsequent state if at least the automatic switch control is valid in the previous state.

As illustrated in No. 1 to No. 4 in FIG. 8A, in a state where the automatic switch control is invalid and during the forward-travel/reverse-travel period, upon the clutch pedal 32A being operated, the traveling clutch 5d is switched to either of the connected state and the disconnected state regardless of the brake pedal.

As illustrated in No. 5 to No. 8 in FIG. 8A, in a state where the automatic switch control is invalid and the clutch lever 32B is in the neutral position (N), the traveling clutch 5d is maintained in the disconnected state even if the clutch pedal 32A is operated.

As illustrated in "previous state" in No. 11 in FIG. 8B, in a state where the automatic switch control is valid and during the forward-travel/reverse-travel period, the traveling clutch 5d is brought into the connected state unless the clutch pedal 32A and the brake pedal are operated. Subsequently, as illustrated in "subsequent state" in No. 11 in FIG. 8, upon the clutch pedal 32A being operated (ON), although the traveling clutch 5d is switched to the disconnected state, the automatic switch control is kept valid (keep valid). In addition, as illustrated in "subsequent state" in No. 11 in FIG. 8B, upon the brake pedal being operated, the first process is performed, and the traveling clutch 5d can be brought into the disconnected state. The automatic switch control is kept valid (keep valid).

As illustrated in "previous state" in No. 12 in FIG. 8B, upon the brake pedal being operated in a state where the clutch pedal 32A is not operated, the first process is performed, and the traveling clutch 5d can be brought into the disconnected state. Subsequently, as illustrated in "subsequent state" in No. 12 in FIG. 8B, upon the clutch pedal 32A being operated (ON), the disconnected state of the traveling clutch 5d is kept (keep disconnected), and the automatic switch control is switched to invalid (switch to invalid). In addition, as illustrated in "subsequent state" in No. 12 in FIG. 8B, upon the operation on the brake pedal being released, the traveling clutch 5d is brought into the connected state, and the automatic switch control is kept valid (keep valid).

As illustrated in "previous state" in No. 13 in FIG. 8B, in a state where the automatic switch control is valid and during the forward-travel/reverse-travel period, upon the clutch pedal 32A being operated without an operation on the brake pedal, the traveling clutch 5d is brought into the disconnected state. Subsequently, with the clutch pedal 32A being operated in "previous state" in No. 13, upon the brake pedal being operated as illustrated in "subsequent state" in No. 13, that is, upon both the clutch pedal 32A and the brake pedal being operated, the automatic switch control is switched from valid to invalid (switch to invalid). In addition, as illustrated in "subsequent state" in No. 13 in FIG. 8B, upon the operation on the clutch pedal 32A being released, the traveling clutch 5d is brought into the connected state, and the automatic switch control is kept valid (keep valid).

As illustrated in "previous state" in No. 14 in FIG. 8B, in a state where the automatic switch control is valid and during the forward-travel/reverse-travel period, upon the brake pedal and the clutch pedal 32A being operated, the traveling clutch 5d is brought into the disconnected state. Subsequently, as illustrated in "subsequent state" in No. 14, unless the brake pedal and the clutch pedal 32A are operated, the disconnected state of the traveling clutch 5d is kept, and the automatic switch control is kept valid (keep valid)

In the above manner, the working vehicle 1 according to the above embodiment includes the prime mover 4 that outputs power; the traveling device 7 (drive) driven by the power output from the prime mover 4; the transmission 5 (transmission mechanism) that transmits the power output from the prime mover 4 to the traveling device 7; the traveling clutch 5d (clutch) provided in the transmission 5 and displaceable to a connected state in which the power is transmitted to the traveling device 7, a disconnected state in which transmission of the power to the traveling device 7 is disconnected, and a half-clutch state in which the power is slidably and partly transmitted to the traveling device 7; the clutch pedal 32A; the detector 53 that detects an operation position of the clutch pedal 32A and outputs a detected value corresponding to the operation position detected; the control device 40 that brings the traveling clutch 5d into the half-clutch state if the detected value from the detector 53 corresponds with a predetermined threshold, brings the traveling clutch 5d into the disconnected state if the detected value is either one of a value less than the threshold and a value greater than the threshold, and brings the traveling clutch 5d into the connected state if the detected value is the other of the value less than the threshold and the value greater than the threshold; the operation member 45; and the change unit 40A that changes a value of the threshold to a different value in accordance with an operation on the operation member 45. According to this configuration, by merely changing the value of the threshold to a different value by the operation on the operation member 45 by the operator, the operation position of the clutch pedal 32A corresponding to the half-clutch state can be changed. That is, the operation position of the clutch pedal 32A indicating a detected value from the detector 53 corresponding with the changed threshold becomes the changed operation position corresponding to the half-clutch state. The operation position of the clutch pedal 32A corresponding to the half-clutch state can be changed to any given position within the range of the positions P1 to P5 illustrated in FIG. 6A. Thus, the half-clutch stroke length can be adjusted. That is, it is possible to provide the working vehicle 1 that can improve operability of a clutch operation.

In addition, if the clutch pedal 32A is in the maximum operation position, the detector 53 outputs the predetermined first detected value as the detected value, if the clutch pedal 32A is in the unoperated position P0, where no operation is performed, the detector 53 outputs the predetermined second detected value, which is a value separated from the first detected value by a certain value range, as the detected value, the threshold is a predetermined single value among a plurality of values that are present between the first detected value and the second detected value, and in accordance with the operation on the operation member 45, the change unit 40A changes the value of the threshold to a value closer to the first detected value than a default value is or a value closer to the second detected value than the default value is. According to this configuration, by changing the value of the threshold to the value closer to the first detected value than a default value is by the operation on the operation member 45 by the operator, the half-clutch stroke length can be made shorter than that before change. In addition, by changing the value of the threshold to the value closer to the second detected value than the default value is by the operation on the operation member 45 by the operator, the half-clutch stroke length can be made longer than that before change.

The working vehicle 1 further includes the display device 50, in which, as illustrated in FIG. 5C and FIG. 5D, the control device 40 causes the display device 50 to display the threshold that is set and causes the display device 50 to display the threshold to be changed by the change unit 40A in accordance with the operation on the operation member 45. According to this configuration, the threshold that is set can be checked on the display devices 50. In addition, since the threshold to be changed by the change unit 40A in accordance with the operation on the operation member 45 by the operator is displayed on the display devices 50, the threshold to be changed can be checked on the display devices 50 when changing the threshold.

The working vehicle 1 further includes the display device 50, in which, as illustrated in FIG. 5A and FIG. 5B, the control device 40 causes the display device 50 to display, as a sensitivity of the clutch pedal 32A, the threshold that is set, and causes the display device 50 to display, as the sensitivity of the clutch pedal 32A, the threshold to be changed by the change unit 40A in accordance with the operation on the operation member 45. According to this configuration, the operator can grasp the sensitivity of the clutch pedal 32A by viewing the sensitivity of the clutch pedal 32A displayed on the display devices 50. In addition, the operator can grasp the sensitivity of the clutch pedal 32A to be changed in accordance with the operation on the operation member 45 by the operator. Thus, the operator can change the sensitivity of the clutch pedal 32A intuitively.

In addition, the operation member 45 is the dial switch 45a provided on the clutch lever 32B (operation lever), and the change unit 40A changes the value of the threshold to a different value in accordance with an operation on the dial switch 45a. According to this configuration, the value of the threshold can be changed to a different value with a pitch in accordance with the operation on the dial switch 45a by the operation on the dial switch 45a by the operator. Thus, the half-clutch stroke length can be adjusted with a pitch in accordance with the operation on the dial switch 45a by the operator.

In addition, the operation member 45 is the second display device 50B (display device) including the display panel 50B1 and the touch panel 50B2 that is disposed on a surface of the display panel 50B1, and the change unit 40A changes the value of the threshold to a different value in accordance with a touch operation on the touch panel 50B2. According to this configuration, the value of the threshold can be changed to a different value in accordance with the touch operation by the operator. Thus, the half-clutch stroke length can be adjusted in accordance with the touch operation by the operator.

The working vehicle 1 further includes: the brake operation member 31; the brake device 46 capable of braking the traveling device 7 in accordance with an operation on the brake operation member 31; and the switching unit 43 that selects whether the automatic switch control is valid or invalid, the automatic switch control being control for switching the traveling clutch 5d from the connected state to the disconnected state, in which the control device 40, if the automatic switch control is invalid, upon an operation on the brake operation member 31, performs brake control for braking the traveling device 7 in accordance with the operation on the brake operation member 31, and, if the automatic switch control is valid, upon an operation on the brake operation member 31, performs the brake control and disconnection control for switching the traveling clutch 5d from the connected state to the disconnected state, and, when the operation on the brake operation member 31 is released after the disconnection control, performs connection control for switching the traveling clutch 5d from the disconnected state to the connected state through the half-clutch state by using the threshold whose value is changed by the change unit 40A. According to this configuration, if the automatic switch control is valid, by the operation on the brake operation member 31, the brake control and the disconnection control are performed, and thus, the traveling clutch 5d can be automatically switched from the connected state to the disconnected state, and the working vehicle 1 can be smoothly stopped without manually switching the traveling clutch 5d. Furthermore, if the operation on the brake operation member 31 is released, the traveling clutch 5d can be switched from the disconnected state to the connected state through the half-clutch state using the changed threshold, and thus, the working vehicle 1 can be started at a clutch connection timing changed by the operator, realizing a start familiar with the operator's driving feeling.

In addition, if the clutch pedal 32A is in the maximum operation position, the detector 53 outputs the predetermined first detected value as the detected value, if the clutch pedal 32A is in the unoperated position P0, where no operation is performed, the detector 53 outputs the predetermined second detected value, which is a value separated from the first detected value by a certain value range, as the detected value, the threshold is a predetermined single value among a plurality of values that are present between the first detected value and the second detected value, and in accordance with the operation on the operation member 45, the change unit 40A changes the value of the threshold to a value closer to the first detected value than a default value is. If the automatic switch control is valid, after an operation on the brake operation member 31, upon the operation on the brake operation member 31 being released, the traveling clutch 5d can be switched from the disconnected state to the connected state through the half-clutch state using the changed threshold. Since the changed threshold is a shorter half-clutch stroke length, that is, the clutch connection timing is an earlier timing changed by the operator, the time for the traveling clutch 5d to be brought into the half-clutch state from the disconnected state can be shortened, the working vehicle 1 can be started with the clutch connection timing shortened, and the work efficiency of the working vehicle 1 can be improved.

The working vehicle 1 further includes the second operation member 54 that is different from the operation member 45, in which if the second operation member 54 and the operation member 45 are operated, the change unit 40A changes the value of the threshold to a different value in accordance with the operation on the operation member 45, and, if the operation member 45 is operated in a state where the second operation member 54 is not operated, the change unit 40A does not change the value of the threshold to a different value regardless of the operation on the operation member 45. According to this configuration, only when the second operation member 54 and the operation member 45 are operated, the value of the threshold can be changed to a different value in accordance with the operation on the operation member 45. Thus, the threshold can be prevented from being changed by an erroneous operation.

The working vehicle 1 is a tractor including: the vehicle body 3; and the coupler 8 that is provided for the vehicle body 3 and that couples a working device for working to the vehicle body 3. According to this configuration, the tractor having the above special effects can be realized.

The drive is the traveling device 7 that gives a propelling force to the vehicle body 3, and the traveling clutch 5d (clutch) is provided in the transmission 5 (transmission mechanism) and is displaceable to a connected state in which the power is transmitted to the traveling device, a disconnected state in which transmission of the power to the traveling device is disconnected, and a half-clutch state in which the power is slidably and partly transmitted to the traveling device. According to this configuration, by merely changing the value of the threshold to a different value by the operation on the operation member 45 by the operator, the operation position of the clutch pedal 32A corresponding to the half-clutch state can be changed, and the tractor with high operability, which can be smoothly started regardless of a physique or experience of the operator, can be realized.

Although the detector 53 employs the detection method such that the detected value decreases in accordance with the operation amount (depressed amount) of the clutch pedal 32A in the above embodiment, the present invention is not limited to this. For example, the clutch-operation detection sensor 53a may be a detection sensor whose detection method is such that the detected value increases in accordance with the operation amount (depressed amount) of the clutch pedal 32A. In this case, if the detected value from the detector 53 (the clutch-operation detection sensor 53a) corresponds with the predetermined threshold, the control device 40 brings the traveling clutch 5d to the half-clutch state; if the detected value exceeds the threshold, the control device 40 brings the traveling clutch 5d into the disconnected state; if the detected value is less than the threshold, the control device 40 brings the traveling clutch 5d into the connected state.

Although the operation member 45 (e.g., the dial switch 45a) is provided on the clutch lever 32B (operation lever) in the above embodiment, the present invention is not limited to this. For example, the operation member 45 may be provided on any of various operation levers (e.g., gear shift and multi-function operation lever) disposed around the operator's seat 10. In addition, if the working vehicle 1 is a construction machine (construction vehicle) such as a loader working machine, the operation member 45 may be provided on a loader operation lever for operating a front loader.

In addition, the operation member 45 may also be provided on a member other than the operation lever around the operator's seat 10.

Although the operation member 45 is the dial switch 45a in the above embodiment, the present invention is not limited to this. For example, the operation member 45 may also be any of various operation switches such as a rotary switch, a button switch, and a slide switch.

Although the half-clutch stroke length of the clutch pedal 32A is adjusted in the above embodiment, the present invention is not limited to this. For example, the present invention is also applicable to adjustment of the half-clutch stroke length of a clutch pedal (POT clutch pedal) for operating the PTO clutch 15.

In addition, the storage unit 40B may store names of a plurality of operators and changed sensitivities or changed values of the threshold voltage for each of the plurality of operators in association with one another, and upon the second display device 50B receiving input of identification information (e.g., name, operator number, or password) of an operator, the control device 40 may read, from the storage unit 40B, and set the changed sensitivity or changed value of the threshold voltage corresponding to the input identification information the operator. Accordingly, the single working vehicle 1 (tractor) can be shared by the plurality of operators, clutch operations can be performed by using the half-clutch stroke length corresponding to the changed sensitivity or changed value of the threshold voltage set by each operator, and the highly convenient working vehicle 1 (tractor) for the plurality of operators can be provided.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working vehicle comprising:
   a prime mover that outputs power;
   a drive driven by the power output from the prime mover;
   a transmission mechanism that transmits the power output from the prime mover to the drive;
   a clutch provided in the transmission mechanism and displaceable to a connected state in which the power is transmitted to the drive, a disconnected state in which transmission of the power to the drive is disconnected, and a half-clutch state in which the power is slidably and partly transmitted to the drive;
   a clutch pedal;
   a detector that detects an operation position of the clutch pedal and outputs a detected value corresponding to the operation position detected;
   a control device that brings the clutch into the half-clutch state if the detected value from the detector corresponds with a predetermined threshold, brings the clutch into the disconnected state if the detected value is either one of a value less than the threshold and a value greater than the threshold, and brings the clutch into the connected state if the detected value is the other of the value less than the threshold and the value greater than the threshold;
   an operation member; and
   a change unit that changes a value of the threshold to a different value in accordance with an operation on the operation member.

2. The working vehicle according to claim 1, wherein
   if the clutch pedal is in a maximum operation position, the detector outputs a predetermined first detected value as the detected value,
   if the clutch pedal is in an unoperated position, where no operation is performed, the detector outputs a predetermined second detected value, which is a value separated from the first detected value by a certain value range, as the detected value,
   the threshold is a predetermined single value among a plurality of values that are present between the first detected value and the second detected value, and
   in accordance with the operation on the operation member, the change unit changes the value of the threshold to a value closer to the first detected value than a default value is or a value closer to the second detected value than the default value is.

3. The working vehicle according to claim 1, further comprising:
   a display device, wherein
   the control device causes the display device to display the threshold that is set, and causes the display device to display the threshold to be changed by the change unit in accordance with the operation on the operation member.

4. The working vehicle according to claim 1, further comprising:
   a display device, wherein
   the control device causes the display device to display, as a sensitivity of the clutch pedal, the threshold that is set, and causes the display device to display, as the sensitivity of the clutch pedal, the threshold to be changed by the change unit in accordance with the operation on the operation member.

5. The working vehicle according to claim 1, wherein
   the operation member is a dial switch provided on an operation lever, and
   the change unit changes the value of the threshold to a different value in accordance with an operation on the dial switch.

6. The working vehicle according to claim 1, wherein
   the operation member is a display device including a display panel and a touch panel that is disposed on a surface of the display panel, and
   the change unit changes the value of the threshold to a different value in accordance with a touch operation on the touch panel.

7. The working vehicle according to claim 1, further comprising:
   a brake operation member;
   a brake device capable of braking the drive in accordance with an operation on the brake operation member; and
   a switching unit that selects whether automatic switch control is valid or invalid, the automatic switch control being control for switching the clutch from the connected state to the disconnected state,
   wherein the control device,
   if the automatic switch control is invalid, upon an operation on the brake operation member, performs brake control for braking the drive in accordance with the operation on the brake operation member, and
   if the automatic switch control is valid, upon an operation on the brake operation member, performs the brake control and disconnection control for switching the clutch from the connected state to the disconnected state, and, when the operation on the brake operation member is released after the disconnection control, performs connection control for switching the clutch from the disconnected state to the connected state through the half-clutch state by using the threshold whose value is changed by the change unit.

8. The working vehicle according to claim 7, wherein
if the clutch pedal is in a maximum operation position, the detector outputs a predetermined first detected value as the detected value,
if the clutch pedal is in an unoperated position, where no operation is performed, the detector outputs a predetermined second detected value, which is a value separated from the first detected value by a certain value range, as the detected value,
the threshold is a predetermined single value among a plurality of values that are present between the first detected value and the second detected value, and
in accordance with the operation on the operation member, the change unit changes the value of the threshold to a value closer to the first detected value than a default value is.

9. The working vehicle according to claim 1, further comprising:
a second operation member that is different from the operation member serving as a first operation member, wherein
if the first operation member and the second operation member are operated, the change unit changes the value of the threshold to a different value in accordance with the operation on the first operation member, and, if the first operation member is operated in a state where the second operation member is not operated, the change unit does not change the value of the threshold to a different value regardless of the operation on the first operation member.

10. A tractor that is the working vehicle according to claim 1, wherein
the tractor includes:
a vehicle body; and
a coupler that is provided for the vehicle body and that couples a working device for working to the vehicle body.

11. The tractor according to claim 10, wherein
the drive is a traveling device that gives a propelling force to the vehicle body, and
the clutch is provided in the transmission mechanism and is displaceable to a connected state in which the power is transmitted to the traveling device, a disconnected state in which transmission of the power to the traveling device is disconnected, and a half-clutch state in which the power is slidably and partly transmitted to the traveling device.

* * * * *